US012618701B2

(12) United States Patent
Griffiths

(10) Patent No.: US 12,618,701 B2
(45) Date of Patent: May 5, 2026

(54) PROBE APPARATUS AND METHOD FOR MEASURING CRYOGENIC EXHAUST FLOW

(71) Applicant: Messer Industries USA, Inc., Bridgewater, NJ (US)

(72) Inventor: John Griffiths, Shaker Heights, OH (US)

(73) Assignee: Messer Industries USA, Inc., Wilmington, DE (US)

(*) Notice: Subject to any disclaimer, the term of this patent is extended or adjusted under 35 U.S.C. 154(b) by 294 days.

(21) Appl. No.: 18/543,231

(22) Filed: Dec. 18, 2023

(65) Prior Publication Data

US 2025/0198818 A1     Jun. 19, 2025

(51) Int. Cl.
*G01F 1/696*     (2006.01)
*F25D 29/00*     (2006.01)
*G01F 1/69*      (2006.01)

(52) U.S. Cl.
CPC ........... *G01F 1/696* (2013.01); *F25D 29/001* (2013.01); *G01F 1/69* (2013.01)

(58) Field of Classification Search
None
See application file for complete search history.

(56) References Cited

U.S. PATENT DOCUMENTS

| | | |
|---|---|---|
| 5,520,682 A | 5/1996 | Baust et al. |
| 2003/0046941 A1 | 3/2003 | Pant et al. |
| 2004/0053204 A1 | 3/2004 | Morris et al. |
| 2006/0235375 A1 | 10/2006 | Littrup et al. |
| 2008/0156091 A1 | 7/2008 | Hickman et al. |
| 2011/0120151 A1 | 5/2011 | Cutting et al. |
| 2014/0230460 A1 | 8/2014 | Newman |
| 2015/0177042 A1 | 6/2015 | Song et al. |
| 2016/0091355 A1* | 3/2016 | Mesnard ................... G01F 1/68 |
| | | 73/197 |
| 2020/0032494 A1 | 1/2020 | Trescott et al. |
| 2020/0284179 A1 | 9/2020 | Swanson et al. |
| 2022/0033239 A1 | 2/2022 | Shamoun et al. |

FOREIGN PATENT DOCUMENTS

| | | | | |
|---|---|---|---|---|
| EP | 0159858 A2 * | 10/1985 | ........... | F25D 29/001 |
| EP | 0307859 A2 * | 3/1989 | ................ | F25D 3/11 |

OTHER PUBLICATIONS

International Search Report for PCT/US2025/033127, Date of Mailing: Aug. 21, 2025, Authorized Officer: Taina Matos, 3 pgs.

(Continued)

*Primary Examiner* — Daniel S Larkin
(74) *Attorney, Agent, or Firm* — Joshua L. Cohen

(57)     ABSTRACT

An apparatus for measuring flow of cryogen exhaust gas from a freezer includes a flow probe with a resistive heater and a flow probe control. The flow probe control is coupled to the flow probe and the flow probe control includes a control circuit configured to operate the resistive heater at a first temperature for a first period of time, operate the resistive heater at a second temperature for a second period of time, and determine a heat transfer coefficient at the flow probe. The first temperature and the second temperature are different and at least one of the first and second temperatures is greater than a predetermined threshold temperature. A related method is also provided.

11 Claims, 12 Drawing Sheets

(56) References Cited

OTHER PUBLICATIONS

Written Opinion for PCT/US2025/033127, Date of Mailing: Aug. 21, 2025, Authorized Officer: Taina Matos, 10 pgs.
International Search Report for PCT/US2024/058334, Date of Mailing: Apr. 17, 2025, Authorized Officer: Kari Rodriquez, 5 pgs.
Written Opinion for PCT/US2024/058334, Date of Mailing: Apr. 17, 2025, Authorized Officer: Kari Rodriquez, 15 pgs.
M. Ndoye et al., "Parameterizable Constant Temperature Anemometer, a New Method for the Analysis of Velocity-Temperature Coupling in Turbulent Heat Transfer," Meas. Sci. Technol., 2010, vol. 21, 7, pp. 1-23.
Invitation to Pay Additional Fees for PCT/US2024/058334, Date of Mailing: Feb. 21, 2025, Authorized Officer: Kari Rodriquez, 3 pgs.

* cited by examiner

200

202 Maintain a first temperature by energizing a resistive heater

204 Has first period of time passed?

N

Y

206 Maintain a second temperature by energizing the resistive heater

208 Has second period of time passed?

N

Y

210 Determine heat transfer coefficient

212 Provide flow information

PROBE APPARATUS AND METHOD FOR MEASURING CRYOGENIC EXHAUST FLOW

BACKGROUND OF THE INVENTION

The present embodiments relate to apparatuses and methods for measuring cryogenic environments used for processing products such as for example food products.

Industrial apparatus for the processing of products, such as food products, often employ various devices for measuring characteristics and/or operating conditions of the apparatus and the environment in which the apparatus is operating. One example industrial apparatus is an industrial freezer that may be used to freeze food products during processing of such food products for storage, transport, and/or further processing. A cryogen may be used to quickly and efficiently freeze or chill such food products. The cryogen is typically controlled and/or dispensed at extremely low temperatures to quickly freeze the food products in an industrial environment.

The extremely low temperatures of the cryogen used in industrial freezers present challenges for their efficient and safe operation in an industrial setting. As a result, existing industrial freezer implementations may suffer from various drawbacks. For example, exhaust systems, which are used in industrial freezer settings to expel spent cryogen, may fail because their components (e.g., exhaust blower, exhaust duct, exhaust measurement devices, etc.) become fouled and/or inoperable due to the accumulation of ice from the extremely low temperatures in which the components must operate. When the exhaust system components and/or related systems fail, become inoperable, and/or deliver inaccurate information, freezer operations must cease to inspect and correct such failures, ensure appropriate safety protocols are in place, perform maintenance, and/or verify proper operation before the freezing of the food products can be resumed. Thus, as a result of these and other deficiencies, existing industrial freezer implementations suffer from increased processing times, higher costs, and risks to operator safety. Therefore, there exists a need for improved apparatuses and methods that can operate continuously and efficiently in the extreme environments of industrial freezing processes.

SUMMARY OF THE INVENTION

This section provides a general summary of the disclosure, and is not a comprehensive disclosure of its full scope or all of its features.

An apparatus for measuring flow of cryogen exhaust gas from a freezer is disclosed herein. The apparatus may comprise a flow probe comprising a resistive heater and a flow probe control coupled to the flow probe. The flow probe control may comprise a control circuit configured to operate the resistive heater at a first temperature for a first period of time, operate the resistive heater at a second temperature for a second period of time, and determine a heat transfer coefficient at the flow probe, wherein the first temperature and the second temperature are different, and at least one of the first temperature and the second temperature may be greater than a predetermined threshold temperature.

A method of determining a flow velocity of a cryogen exhaust gas from a freezer is also disclosed herein. The method may comprise energizing the flow probe with a first voltage to maintain a first temperature for a first period of time, energizing the flow probe with a second voltage to maintain a second temperature for a second period of time, wherein the second temperature is different from the first temperature. The method further includes determining a heat transfer coefficient at the flow probe, and determining a velocity of the cryogen exhaust gas at the flow probe based on the heat transfer coefficient.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

For a more complete understanding of the present invention, reference may be had to the following description of exemplary embodiments considered in connection with the accompanying drawing Figures, of which.

Corresponding reference numerals indicate corresponding parts throughout the several views of the drawings.

DETAILED DESCRIPTION OF THE INVENTION

Figure 1:
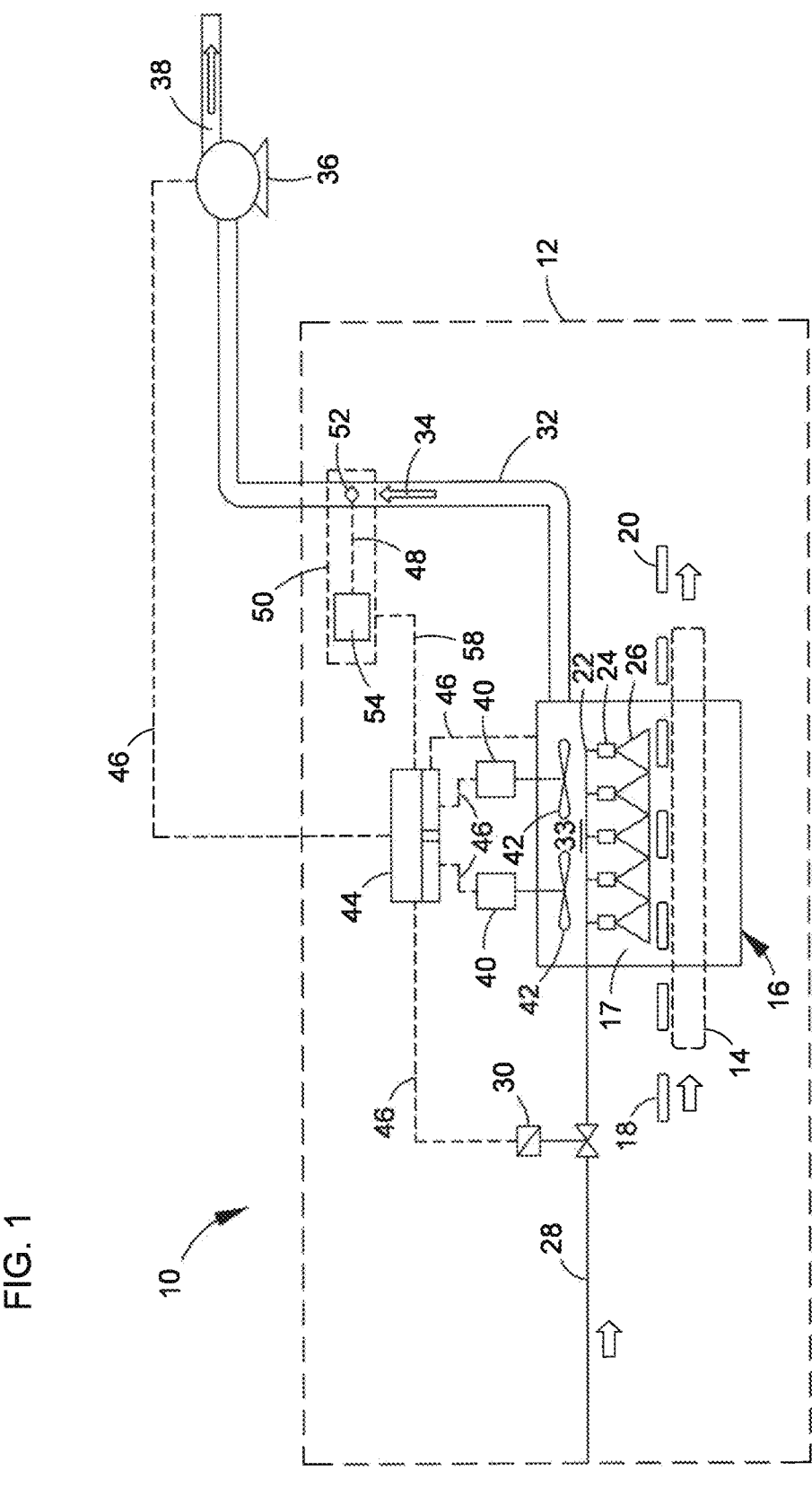
FIG. 1 is a schematic view of an example cryogenic processing environment that includes one embodiment of a probe apparatus in accordance with the present disclosure.

Before explaining the inventive embodiments in detail, it is to be understood that the invention is not limited in its application to the details of construction and arrangement of parts illustrated in the accompanying drawings, if any, since the invention is capable of other embodiments and being practiced or carried out in various ways. Also, it is to be understood that the phraseology or terminology employed herein is for the purpose of description and not of limitation.

In the following description, terms such as a horizontal, upright, vertical, above, below, beneath and the like, are to be used solely for the purpose of clarity illustrating the invention and should not be taken as words of limitation.

The drawings are for the purpose of illustrating the invention and are not intended to be to scale.

The embodiments of the present disclosure are directed to flow probes that may be used to determine a velocity and/or flow of gas moving through a chamber. The embodiments of the present disclosure may be used, for example, to determine a velocity of cryogen exhaust gas that flows out of an exhaust duct of a freezer or freezer system, such as an industrial freezer used in a food processing environment. Such freezers may use a cryogen such as nitrogen ($N_2$) or carbon dioxide ($CO_2$) to quickly and thoroughly chill or freeze food products. The freezers may dispense the cryogen onto the food products at an extremely low temperature (e.g., $-100°$ F./$-73°$ C., or lower) to chill or freeze the food products.

The cryogen may be dispensed, for example, in a tunnel or other chamber. The cryogen in the tunnel or other chamber reduces substantially the temperature of same such that cooled or colder atmosphere, which may have some cryogen gas therein, is removed via an exhaust duct. Without exhausting the cryogen, or if the cryogen is not sufficiently exhausted, the cryogen functions as an asphyxiant or toxin through accumulation and displacement of ambient air in a processing facility housing the industrial freezer. This asphyxiant may cause safety concerns for operating personnel in the processing facility. It is important, therefore, to measure the flow of the cryogen exhaust gas to determine whether the exhaust process is properly working. This allows the freezing process to safely continue operation.

Existing systems and methods for measuring the flow of cryogen exhaust gas in freezing processes suffer from various drawbacks. For example, the extremely low temperatures of the cryogen exhaust gas may lead to the accumulation of ice on various pieces of equipment such as sensors, probes, and the like. The accumulation of ice and/or the extremely low operating temperatures can lead to the failure of the sensors or other measurement equipment. In other instances, the low temperatures and/or ice may cause inaccurate measurements to be determined and/or delivered from the sensors or other measurement equipment. The failure of such sensors or the inaccurate measurements by the sensors can result in incorrect operation of the freezer and/or continued operation of the freezer when cryogen exhaust gas is not being properly exhausted from the processing facility. Still further, the inaccuracies and/or failures may lead to intermittent stoppages of the freezing process. Such problems can lead to increased costs, inefficient operation, increased maintenance, and safety concerns.

Existing freezer systems measure exhaust flow by utilizing conventional flow sensors such as vane anemometers or differential pressure transmitters. These devices, however, suffer from many of the deficiencies described above. Vane anemometers, for example, typically include a vane that rotates in the presence of a moving flow. The vane can be used to measure a velocity of cryogen exhaust gas moving in an exhaust duct by detecting a rotation of the vane that is positioned inside the duct. The cryogen exhaust gas that moves past the vane may include ice, frozen food particles, and other materials that may accumulate on the vane. Vane anemometers used in an exhaust duct of an industrial freezer environment are prone to becoming fouled by the ice and other material. This fouling material inhibits the rotation of the vane and leads to failure and/or inaccurate measurements of the velocity of the cryogen exhaust gas. As a result, vane anemometers can only be used for very brief periods of time, after which the vane anemometers must be removed, heated, and/or repaired before operations can continue.

Differential pressure transmitter systems also suffer from the deficiencies discussed above, particularly when used in an industrial freezer environment. Indeed, differential pressure transmitter systems typically include piping or tubing having a small inner diameter that are placed at various locations along a cryogen exhaust duct to measure a difference in pressure between two distinct points. Differential pressure can be measured between various locations along the cryogen exhaust duct to determine a flow of the cryogen exhaust gas through the exhaust duct. The piping or tubing of differential pressure transmitter systems can become clogged, restricted, or otherwise fouled by the ice, food particles or other frozen materials in the exhaust duct. This fouling often leads to the failure and/or inaccurate measurement of the flow of the cryogen exhaust gas in the exhaust duct. When such failures or inaccuracies occur, the differential pressure transmitter systems must be taken offline for cleaning, maintenance and/or repair.

Having recognized a need in the art, and the limitations and deficiencies of existing devices used in the art to measure exhaust flow of cold gases in cold or sub-freezing environments, the present disclosure now describes new apparatus and method embodiments for addressing the need in the art and for overcoming the limitations and deficiencies of existing devices and methods. The apparatuses and methods of the present embodiments disclosed may include flow probes and related controls that are improvements over vane anemometers, differential pressure systems and other existing measurement devices and systems. In some embodiments, the apparatuses and methods of the present disclosure include a flow probe that may be positioned in a cryogen exhaust duct and operated without interruption in low temperature environments. In some embodiments, the flow probe according to the present disclosure may include a resistive heater that may be used to measure a flow of cryogen exhaust gas and may be operated at multiple elevated temperatures. The elevated operating temperatures of the flow probe of the present disclosure enable the flow probe to remain free of ice, and as a result, deliver accurate flow measurements without interruption. The accurate, uninterrupted flow measurement of the apparatuses and methods of the present embodiments results in lower costs, improved reliability, less downtime and maintenance, and improved efficiency over existing systems and methods.

The discussion above and the further descriptions below describe a flow probe that may be used in the context of an industrial food processing freezer environment. It should be appreciated, however, that application of the embodiments of the present disclosure are not limited to food processing applications. The embodiments of the present disclosure may also be used in, for example, medical chilling and freezing applications, pharmaceutical chilling and freezing applications or other chilling and freezing applications.

Referring now to FIG. 1, an example of a processing building 10 (or "building") that includes a cryogenic processing environment 12 is shown. In the example shown, the building 10 may include a conveyor 14 configured to move warm (or ambient) food products 18 through a freezer (or chiller) 16, after which the food products 18 are transformed into chilled or frozen food products 20.

The freezer 16 may include a spray header assembly 22 that supplies a cryogen 26 to one or more spray nozzles 24 that dispense the cryogen 26 onto the food products 18 as they pass through the freezer 16. The spray header assembly 22 may be fluidly connected to a cryogen supply line 28 that can feed the cryogen 26 from a cryogen source (not shown). A cryogen control valve 30 may be positioned along the cryogen supply line 28 to control an amount of cryogen 26 that is being provided to the spray header assembly 22. The cryogen control valve 30 can be used to begin and/or stop a flow of cryogen 26 to the spray header assembly 22.

After cryogen 26 is dispensed onto the food products 18, cryogen exhaust gas 34 may be removed from the freezer 16 and from the building 10 through an exhaust duct 32 or cryogen exhaust. The exhaust duct 32 may comprise a channel through which the cryogen exhaust gas 34 can be moved from the freezer 16 to a location external to the building 10. In the example shown, a blower 36 is fluidly coupled to the exhaust duct 32 to assist in moving the cryogen exhaust gas 34 toward an exhaust outlet 38. The exhaust duct 32 can be fluidly coupled from the freezer 16 through a wall of the building 10 to the exhaust outlet 38. As further shown, the freezer 16 may include one or more motors 40, each of which motor is coupled to a corresponding one of fans 42. The motors 40 may power the fans 42 to further move cryogen processing gas 33 within an inner chamber 17 of the freezer 16, wherein the cryogen processing gas 33 is circulated in the inner chamber to facilitate uniform and efficient application to the food products 18. The fans 42 may also facilitate movement of the cryogen processing gas 33 to the exhaust duct 32.

The freezer 16 may also include a freezer control 44. The freezer control 44 may be a suitable processing device, circuit, programmable logic controller (PLC), or other controller that may be operably coupled to various elements of the cryogenic processing environment 12, such as the freezer 16, to cause various functions of the freezer 16 to be actuated. The freezer control 44 may be coupled to the cryogen control valve 30, the freezer 16 including the motors 40, and/or the blower 36 as shown by broken lines 46, and may be configured to send power, adjust various parameters, and/or collect information regarding the operation of same and various other elements.

In the embodiment shown in FIG. 1, the freezer control 44 may also be coupled to a flow probe control 54 component of a flow probe assembly 50, as shown by the broken line 58. The flow probe assembly 50 may include a flow probe 52 and the flow probe control 54. The flow probe assembly 50 provides the advantageous improvements over existing flow measurement devices previously described. The flow probe assembly 50 includes the flow probe 52 that can be mounted to and/or connected within the exhaust duct 32, such as in a channel of the exhaust duct 32. Notably, an interior of the exhaust duct 32 (or the channel) is subjected to extremely low temperatures of the cryogen exhaust gas 34 as the cryogen exhaust gas 34 is removed from the freezer 16 to the exhaust outlet 38. Indeed, the conditions within the exhaust duct 32 may reach temperatures in the range of 50° F. (10° C.) to –300° F. (–184° C.), although an exhaust duct operating with an exhaust greater than 35° F. (2° C.) usually does not have icing issues. Cryogen exhaust gas 34 ranging in temperature from –150° F. (–101° C.) to 30° F. (–1° C.) usually causes the accumulation of ice to surfaces located inside the exhaust duct 32.

The flow probe 52 may be coupled to the flow probe control 54, as shown by the broken line 48. The flow probe control 54 may include circuitry, processing devices, memory, and/or other elements to collect information from the flow probe 52 and to control the signals being sent to the flow probe 52 to perform the operations discussed further below. The flow probe control 54 may, in turn, be operably coupled to the freezer control 44 to exchange information regarding the operating conditions inside the exhaust duct 32, as shown by the broken line 58. The flow probe control

54 may be configured to determine a velocity of the cryogen exhaust gas 34 moving through the exhaust duct 32 from the freezer 16 to the exhaust outlet 38. As can be appreciated, the flow probe control 54 may be positioned at other locations outside of the exhaust duct 32. In the example shown, the flow probe control 54 is separate from the freezer control 44 and operably connected to the freezer control 44 using a suitable connection (either wired or wireless). In other examples, the flow probe control 54 may be co-located with the freezer control 44, such as in a common enclosure and/or using some common circuitry.

The flow probe control 54 may control operation of the flow probe 52 in a manner that enables the flow probe 52 to both operate and provide accurate information regarding a flow of the cryogen exhaust gas 34 in the exhaust duct 32 without interruption. Indeed, the flow probe control 54 may energize the flow probe 52 to determine a heat transfer coefficient between the flow probe 52 and the cryogen exhaust gas 34. The heat transfer coefficient may then be used to determine a velocity of the cryogen exhaust gas 34 inside the exhaust duct 32. Notably, determining the heat transfer coefficient generally involves knowing an ambient temperature inside of the exhaust duct 32. However, and contrary to existing devices and sensors, the flow probe 52 of the present embodiments does not need to directly measure the ambient temperature inside of the exhaust duct 32 for an extended period of time, although the flow probe 52 may do so. Instead, the flow probe 52 may be operated at one or more elevated temperatures so that the flow probe 52 is not subjected to the accumulation of ice or other frozen particles. As a result, the flow probe 52 is able to avoid ice build-up, damage and interruptions to its operation that may otherwise occur if continually operating at the low ambient temperatures within the exhaust duct 32, as discussed above. The flow probe control 54 may operate the flow probe 52 at the one or more elevated temperature(s) (e.g., by oscillating between the two or more temperatures), and use information obtained from the oscillating operation of the flow probe 52 to determine or calculate the ambient temperature inside of the exhaust duct 32 (discussed in further detail below). In some embodiments, the flow probe control 54 may oscillate the flow probe 52 between an elevated temperature and an ambient temperature in the exhaust duct 32. When the flow probe 52 is operated at the elevated temperature, ice or other frozen particles that may have started to accumulate (e.g., while operating at the ambient temperature) may melt, thereby avoiding damage and/or interruptions to the operation of the flow probe 52. In other embodiments, the flow probe control 54 may oscillate the flow probe 52 between two or more elevated temperatures. By operating in this manner, the flow probe 52 remains clear of ice and/or prevents a detrimental accumulation of ice on the flow probe 52, which in turn prevents damage to the flow probe 52 and interruptions to its operation.

At least one among the one or more elevated temperature levels at which the flow probe 52 operates may be greater than a predetermined threshold temperature. The predetermined threshold temperature may correspond to a temperature sufficient to prevent and/or minimize the detrimental accumulation of ice on the flow probe 52. In some examples, the predetermined threshold temperature may comprise a temperature greater than 100° Fahrenheit (F) or 38° Celsius (C) and up to 250° F. (121° C.). In other examples, the predetermined temperature may comprise a temperature greater than 32° F. (0° C.) or 90° F. (32° C.) for example. In other examples, other predetermined temperature thresholds can be used.

Figure 2:
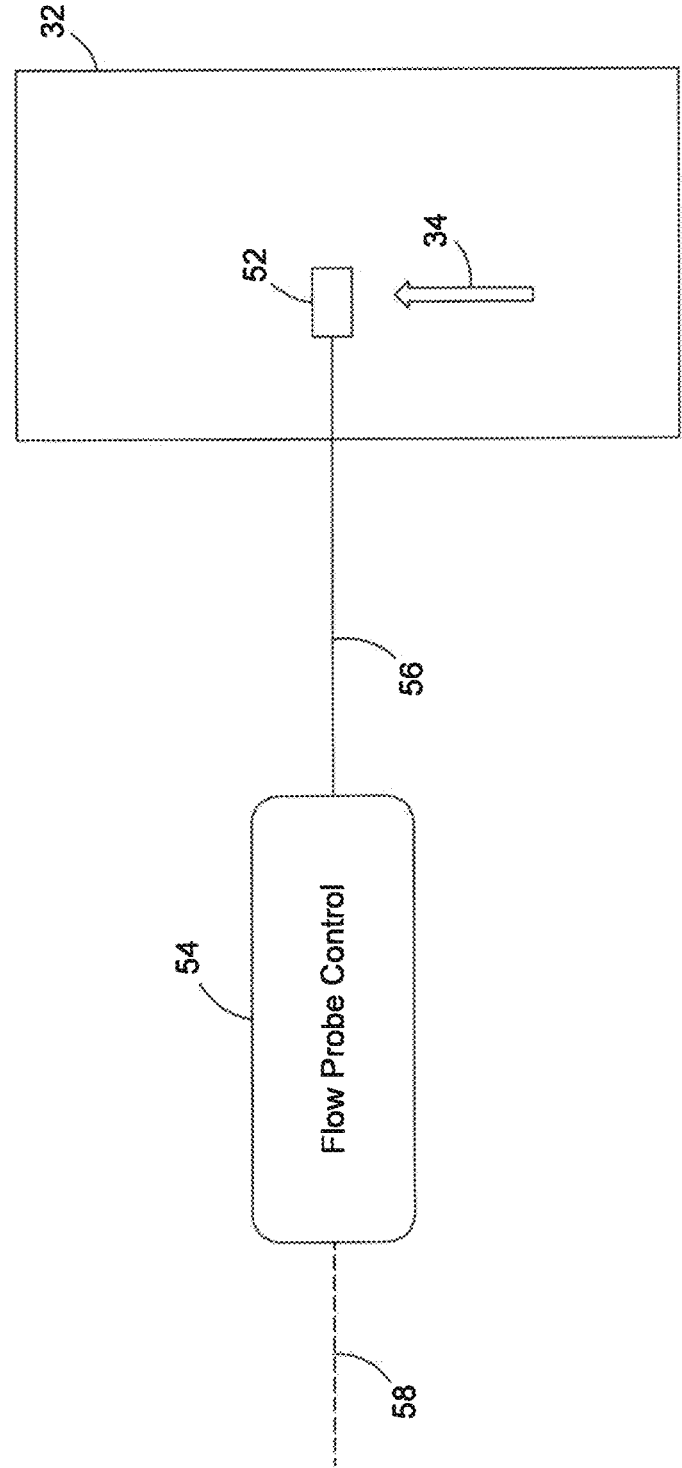
FIG. 2 is a schematic view of a portion of the cryogenic processing environment of FIG. 1 showing an example probe apparatus.

Referring also to FIG. 2, the flow probe 52 and flow probe control 54 of FIG. 1 are shown. As shown, the flow probe 52 may be mounted in the exhaust duct 32 such that the flow probe 52 is exposed to the cryogen exhaust gas 34 being moved from the freezer 16 through the exhaust outlet 38. The connection or coupling of the flow probe 52 to the flow probe control 54 represented by the broken line 48 in FIG. 1 may include a flow probe conduit 56 extending from and connecting the flow probe 52 with the flow probe control 54. The flow probe conduit 56 may be a suitable tube or pipe through which signal lines and/or power lines may electrically connect the flow probe 52 to the flow probe control 54. A flow probe signal line 58 may electrically connect the flow probe control 54 to the freezer control 44.

Figure 3:
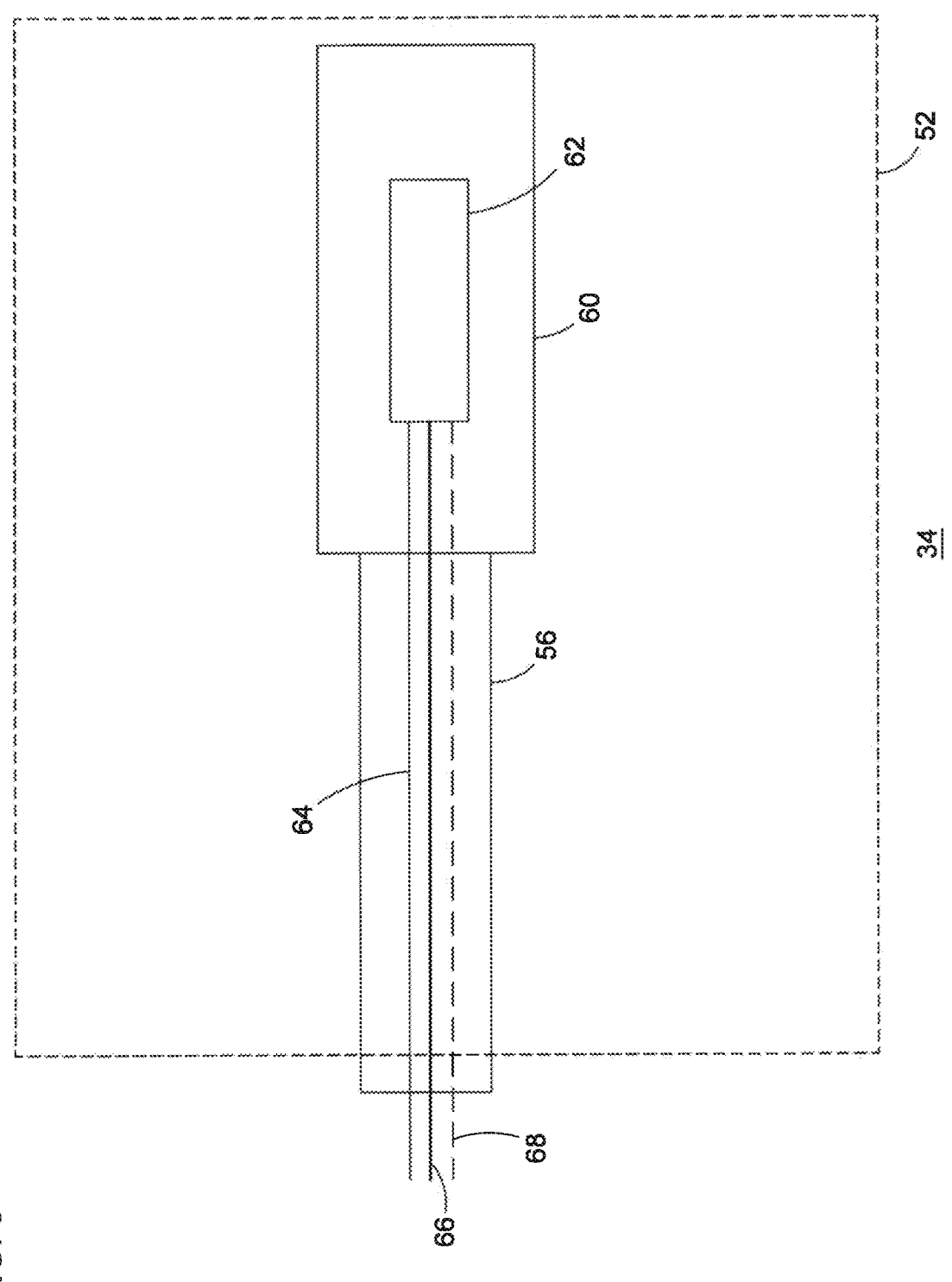
FIG. 3 is schematic view of an example probe assembly that may be used in the probe apparatus of FIG. 2.

Turning now to FIG. 3, an exemplary embodiment of the flow probe 52 is shown exposed to the cryogen exhaust gas 34 in the exhaust duct 32. The flow probe 52 may include a flow probe enclosure 60 and a resistive heater 62. The flow probe enclosure 60 does not necessarily have to be used if the resistive heater 62 is durable enough to survive conditions in the exhaust duct 32, including conditions during cleaning of the exhaust duct 32. The flow probe enclosure 60 may surround the resistive heater 62. The resistive heater 62 may be of sufficient durability to survive and function in the exhaust duct 32 during, for example, cleaning of the exhaust duct 32. The resistive heater 62 may be connected to the flow probe enclosure 60 using a conductive adhesive or other suitable fastener or attachment. The resistive heater 62 may be, for example, a standard off-the-shelf 100 ohm Resistance Temperature Detector (RTD). The resistive heater 62 and the flow probe enclosure 60 may be positioned within the exhaust duct 32 so that the resistive heater 62 is exposed to the cryogen exhaust gas 34 moving through the exhaust duct 32 and away from the freezer 16. The resistive heater 62 may be electrically coupled to the flow probe control 54 (not shown in FIG. 3) via one or more wires or lines positioned inside a flow probe conduit 56. While the flow probe conduit 56 may not be required, the flow probe conduit 56 may be utilized to guide and support the wires or lines electrically coupling the flow probe 52 to the flow probe control 54.

In the embodiment shown in FIG. 3, the one or more wires or lines may include a first control wire 64, a second control wire 66, and a flow probe signal line 68, all of which may extend through the flow probe conduit 56. The first control wire 64 and the second control wire 66 may electrically couple the resistive heater 62 to a power source (not shown) to energize the resistive heater 62. The first control wire 64 and the second control wire 66 may also be used to collect information regarding the operating conditions of the resistive heater 62. A third control wire 68 is an optional wire or line that may be included to provide information from the flow probe 52 to the flow probe control 54. For example, to mitigate the resistance of the first and second control wires 64,66 if and when the distance between the flow probe 52 and the flow probe control 54 is excessive, the third control wire 68 may be included to provide a suitable signal for the collection of information. In a preferred example, the resistance of the first control wire 64 and the second control wire 66 may be less than 5% of the resistance of the resistive heater 62. It is desirable to provide a configuration in which the resistance of the control wires 64, 66 do not significantly contribute resistance to the circuit so that that the measurement of the temperature at the flow probe 52 is accurately determined. For example, if the control wires 64, 66 were implemented as 16 American Wire Gauge (AWG) wires and had a length of 200 feet (60.96 m), the control wires 64, 66 could add 1.6 ohms to the circuit and raise the apparent resistance of the resistive heater 62 by a corresponding amount. This increased apparent resistance of the resistive heater 62 could then correspond to a "temperature offset" of approximately 7° F. (i.e., a temperature difference of 4° C.) when the temperature is determined by the flow probe control 54. In such instance, this circumstance may be mitigated by adding the third control wire 68. In other examples, additional wires or lines may be included such as additional signal lines from the flow probe 52.

Figure 4:
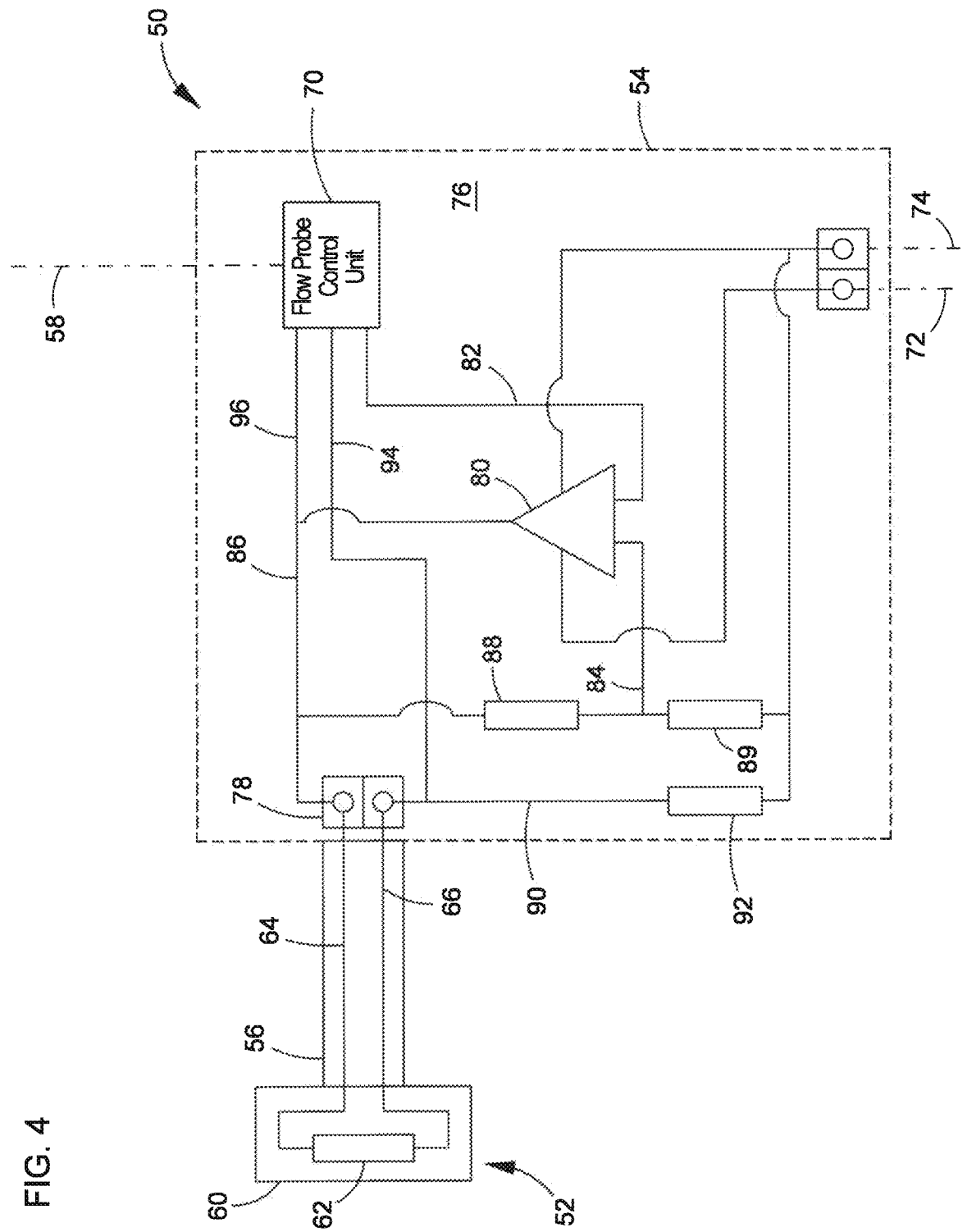
FIG. 4 is a circuit diagram of an example circuit that may be used in the probe apparatus of FIG. 2.

Turning now to FIG. 4, the flow probe assembly 50 is shown in further detail. In this example, the flow probe assembly 50 may include the flow probe 52 coupled to the flow probe control 54 by two or more control wires. In this embodiment, the flow probe 52 is shown coupled to the flow probe control 54 by the first control wire 64 and the second control wire 66. The first control wire 64 and the second control wire 66 may be positioned inside the flow probe conduit 56. The flow probe conduit 56 can be a tube, pipe or other material through which the first control wire 64 and the second control wire 66 can be guided and supported.

As further shown, the flow probe control 54 may include a flow probe control unit 70 coupled to a flow probe control circuit 76. A flow probe signal line 58 may transfer information obtained from the flow probe control unit 70 and/or the flow probe 52 to the freezer control 44 (FIG. 1). A positive or first power line 72 and a negative or second power line 74 may feed into the flow probe control 54 to provide a power signal to the flow probe control circuit 76 and to the flow probe 52, as will be further discussed below.

The flow probe control unit 70 may include a processor, memory and computer-readable instructions, and may be configured as a computing device, application specific circuit, programmable logic controller (PLC) or other suitable controller. The flow probe control unit 70 may operate to cause a voltage to be delivered to the resistive heater 62 within the flow probe 52. In response, the flow probe 52 may be heated to a temperature greater than the predetermined threshold temperature as previously described. The flow probe control unit 70 may also obtain information such as voltage, current, or other information from the flow probe 52 to determine an ambient temperature within the exhaust duct 32 and a heat transfer coefficient between the flow probe 52 and the cryogen exhaust gas 34 that may surround the flow probe 52 in the exhaust duct 32. The heat transfer coefficient may then be used to determine a velocity of the cryogen exhaust gas 34 flowing through the exhaust duct 32.

As noted above, the flow probe 52 may include a resistive heater 62 coupled to the first control wire 64 and the second control wire 66. The resistive heater 62 made be made of a known material with a known relationship between temperature and resistance. As further discussed below, this known relationship may be leveraged to determine a temperature at the resistive heater 62.

The resistive heater 62 may be positioned within the flow probe enclosure 60. The first control wire 64 and the second control wire 66 may electrically couple the resistive heater 62 to the flow probe control circuit 76. A screw terminal 78 may be used to couple the first control wire 64 and the second control wire 66 to the flow probe control circuit 76. In other examples, other suitable connectors and/or connections can be used.

The flow probe control unit 70 and the flow probe control circuit 76 may operate the flow probe 52 to determine a heat transfer coefficient inside the exhaust duct 32. From the heat transfer coefficient, a velocity of the cryogen exhaust gas 34 in the exhaust duct 32 may be determined. For example, the flow probe control unit 70 and the flow probe control circuit

76 may be used to supply a voltage (V) across the resistive heater 62. The current (I) passing through the resistive heater 62 can then be measured and obtained by the flow probe control unit 70. The flow probe control unit 70 may then use the voltage (V) and the current (I) passing through the resistive heater 62 to determine a resistance (R) of the resistive heater 62. The flow probe control unit 70 may also use the voltage (V) and the current (I) passing through the resistive heater 62 to determine a power (Q) loss by the resistive heater.

Since the resistance (R) has been determined by the flow probe control unit 70, the flow probe control unit 70 can then determine, based on the resistance (R), a temperature $T_{HOT}$ of the resistive heater 62. In order to determine the heat transfer coefficient, however, the ambient temperature $T_{COLD}$ of the cryogen exhaust gas 34 in the exhaust duct 32 must be determined. Existing systems and methods directly measure the ambient temperature $T_{COLD}$ in the exhaust duct 32 using a separate temperature sensor such as a thermocouple, thermistor, or the like. Such separate temperature sensors are typically positioned away from other components so as to not be influenced by temperature variations of the other components. However, use of such temperature sensors to directly (and continuously for extended periods) measure the ambient temperature $T_{COLD}$ are prone to ice build-up, failure and the like. Thus, contrary to existing systems and methods, the flow probe 52 of the present disclosure does not require a separate temperature sensor to determine the ambient temperature $T_{COLD}$ in the exhaust duct 32. Instead, the ambient temperature $T_{COLD}$ in the exhaust duct 32 may be determined using information obtained from the same resistive heater 62.

In some embodiments, the flow probe 52 may be oscillated between an elevated temperature ($T_{HOT}$) and an ambient temperature ($T_{COLD}$) of the cryogen exhaust gas 34 in the exhaust duct 32. During both operating conditions, the heat transfer coefficient can be determined so that a velocity of cryogen exhaust gas 34 can also be determined. The elevated temperature ($T_{HOT}$) may be above the predetermined temperature threshold described above to prevent detrimental accumulation of ice or other frozen particles on the flow probe 52 that may have begun to accumulate while operating at the ambient temperature ($T_{COLD}$).

When the flow probe 52 is operated in a temperature sensing mode of operation (i.e., when the flow probe 52 is used to determine an ambient temperature ($T_{COLD}$) of the cryogen exhaust gas 34), a nominal voltage may be applied to the resistive heater 62 of the flow probe 52. The nominal voltage may correspond to a voltage low enough such that a temperature of the resistive heater 62 corresponds to the temperature of the ambient cryogen exhaust gas 34. In some examples, the nominal voltage may be less than about 1 Volt. In other examples, the nominal voltage may have other values.

In some embodiments, the ambient temperature ($T_{COLD}$) may be determined indirectly by oscillating the resistive heater 62 between at least two different elevated temperatures ($T_{HOT1}$, $T_{HOT2}$, etc.), and using information associated with such operation to calculate the ambient temperature $T_{COLD}$. In such embodiments, the two or more elevated temperatures ($T_{HOT1}$, $T_{HOT2}$, etc.) may each be greater than the predetermined temperature threshold previously described. The equations below, for example, may be used to determine the ambient temperature $T_{COLD}$ in the exhaust duct 32.

$$T_{COLD} = T_{HOT1} - (T_{HOT1} - T_{HOT2}) \times Q_1 / (Q_1 / Q_2), \qquad \text{Eq. 1}$$

$T_{HOT1}$ is the first elevated temperature,
$T_{HOT2}$ is the second elevated temperature,
$Q_1$ is the power lost at the first elevated temperature, and
$Q_2$ is the power lost at the second elevated temperature.
The following equation can then be used to calculate the heat transfer coefficient.

$$Q = U \ A(T_{HOT} - T_{COLD}) \qquad \text{Eq. 2}$$

where Q is power lost by the resistive heater,
U is the heat transfer coefficient,
A is the flow probe area (measured as surface area of the probe exposed to the cryogen exhaust gas),
$T_{HOT}$ is the operating temperature of the resistive heater, and
$T_{COLD}$ is the temperature in the exhaust duct.

In some instances, where the heat transfer coefficient (U) is constant with respect to temperature, Eq. 2 may be used to determine $T_{COLD}$ after the resistive heater 62 is oscillated between two different elevated operating temperatures (e.g., $T_{HOT1}$ and $T_{HOT2}$). In other instances, where the heat transfer coefficient (U) may not be constant with respect to temperature, Eq. 2 may be used to determine $T_{COLD}$ after the resistive heater 62 is operated at least at three different elevated operating temperatures (e.g., $T_{HOT1}$, $T_{HOT2}$ and $T_{HOT3}$). Thus, the temperature $T_{COLD}$ of the cryogen exhaust gas 34 in the exhaust duct 32 at the flow probe 52 may be indirectly determined without a need for an additional or separate sensor, and without a need to directly measure $T_{COLD}$.

The flow probe control unit 70 and the flow probe control circuit 76 are designed to not only measure the voltage (V) across the resistive heater 62 and the current (I) passing through the resistive heater 62, but also to determine the heat transfer coefficient (U) and to control the voltage (V) across the resistive heater 62. In this manner, the flow probe control unit 70 may oscillate the resistive heater 62 between any number of different temperatures. To achieve a desired temperature, the flow probe control unit 70 may cause a nominal voltage to be applied to an operational amplifier 80 via an upper voltage control wire 82 within the flow probe control circuit 76. The operational amplifier 80 may compare the nominal voltage with a voltage in the lower voltage control wire 84. The operational amplifier 80 may then generate a voltage in an upper voltage wire 86 in order to change the voltage in the upper voltage wire 86 such that the voltage in the lower voltage control wire 84 and the voltage in the upper voltage control wire 82 are the same.

In some embodiments, the flow probe control circuit 76 may also include a voltage divider configured as a first resistor 88 and a second resistor 89. The voltage divider may enable the voltage in the upper voltage control wire 82 to be lower than the voltage in the upper voltage wire 86.

As shown, the upper voltage wire 86 may be coupled to the first control wire 64 (via screw connector 78 or other connector, for example). The second control wire 66 may be coupled to the lower voltage wire 90 (via the screw connector 78 or other connector, for example). The lower voltage wire 90 may then be coupled to a lower voltage resistor 92 having a known resistance, and the lower voltage resistor 92 may be coupled to the negative power line 74. As a result, voltage in the upper voltage wire 86 is able to force a current (I) to flow through both the resistive heater 62 and the lower voltage resistor 92. In this manner, the flow probe control circuit 76 is able to energize the resistive heater 62 as desired.

An upper voltage sensing wire 96 of the flow probe control circuit 76 may provide the voltage ($V_1$) of the upper voltage wire 86 to the flow probe control unit 70, and a lower voltage sensing wire 94 of the flow probe control circuit 76 may provide the voltage ($V_2$) of the lower voltage wire 90 (e.g., the voltage between the flow probe 52 and the lower voltage resistor 92) to the flow probe control unit 70. Based on these voltages ($V_1$ and $V_2$), flow probe control unit 70 may then determine a current (I) flowing through the resistive heater 62, since the resistance ($R_2$) of the lower voltage resistor 92 is known (e.g., via equation $V_2 = I R_2$). The flow probe control unit 70 may also determine the voltage ($V_3$) across the resistive heater 62 as a difference between the voltages ($V_3 = V_1 - V_2$) provided by the upper voltage sensing wire 96 and the lower voltage sensing wire 94. Given that the relationship between the resistance of the resistive heater 62 and its temperature is known, the flow probe control unit 70 may determine a temperature ($T_{HOT}$) of the flow probe 52.

If the determined temperature ($T_{HOT}$) of the resistive heater 62 is at or within a predetermined temperature range of a first operating temperature, the flow probe control unit 70 may maintain this operating temperature and operate the flow probe 52 for a predetermined first period of time. If the determined temperature of the resistive heater 62 is outside of the predetermined temperature range of the first operating temperature, the flow probe control unit 70 may adjust the voltage (e.g., increase voltage to increase temperature and/or decrease voltage to decrease temperature) accordingly until a temperature that is within the predetermined temperature range of the first operating temperature is achieved. When the determined temperature is at or within the predetermined range of the first operating temperature, the heat output (Q) by the flow probe 52 may be determined (e.g., via equation $Q = V_3 I$). After a predetermined period of time has passed, the flow probe control unit 70 may proceed to change the first operating temperature to a second operating temperature. The flow probe control unit 70 does not need to change the operating temperature once this predetermined time period has passed or elapsed, although it has the option to do so.

When the first period of time has passed, the flow probe control unit 70 may adjust the voltage applied to the resistive heater 62 and change the operating temperature of the resistive heater 62 to second operating temperature that is different from the first operating temperature. In some examples, the operating temperatures may include an elevated temperature and an ambient temperature. In other examples, the operating temperatures may include multiple elevated temperatures that differ from each other. If multiple elevated temperatures are used, the multiple elevated temperatures may differ by various degrees. In some embodiments, the multiple elevated temperatures may differ by at least 10° F. (−12° C.). The flow probe control unit 70 may use the flow probe control circuit 76 as previously described and adjust the voltage accordingly until the temperature of the resistive heater 62 is within a predetermined temperature range of the second operating temperature.

In embodiments in which the flow probe control unit 70 directly determines an ambient temperature ($T_{COLD}$) of the cryogen exhaust gas 34, the flow probe control unit 70 may cause a low or nominal voltage (e.g., less than 1 volt) to be fixed at the upper voltage control wire 82. The resistive heater 62 is then permitted to reach an ambient temperature of the cryogen exhaust gas 34 inside the exhaust duct 32, and operated at this ambient temperature for a limited, predetermined period of time. The resistive heater 62 is subsequently operated at an elevated temperature ($T_{HOT}$), during which any ice or frozen particles that have begun to accumulate melt or are removed, as discussed above.

The flow probe control unit 70 may determine a heat transfer coefficient inside the exhaust duct 32 and determine a velocity of the cryogen exhaust gas 34 in the exhaust duct 32 during both operating conditions, at the different temperatures. In some instances, the flow probe control unit 70 may operate the flow probe 52 at a third operating temperature and may perform the actions previously described to achieve a third operating temperature that is different from the first operating temperature and the second operating temperature. The flow probe control unit 70 may operate the flow probe 52 to continuously oscillate between the various operating temperatures, so as to determine and monitor the cryogen exhaust gas 34 flow velocities.

Figure 5:
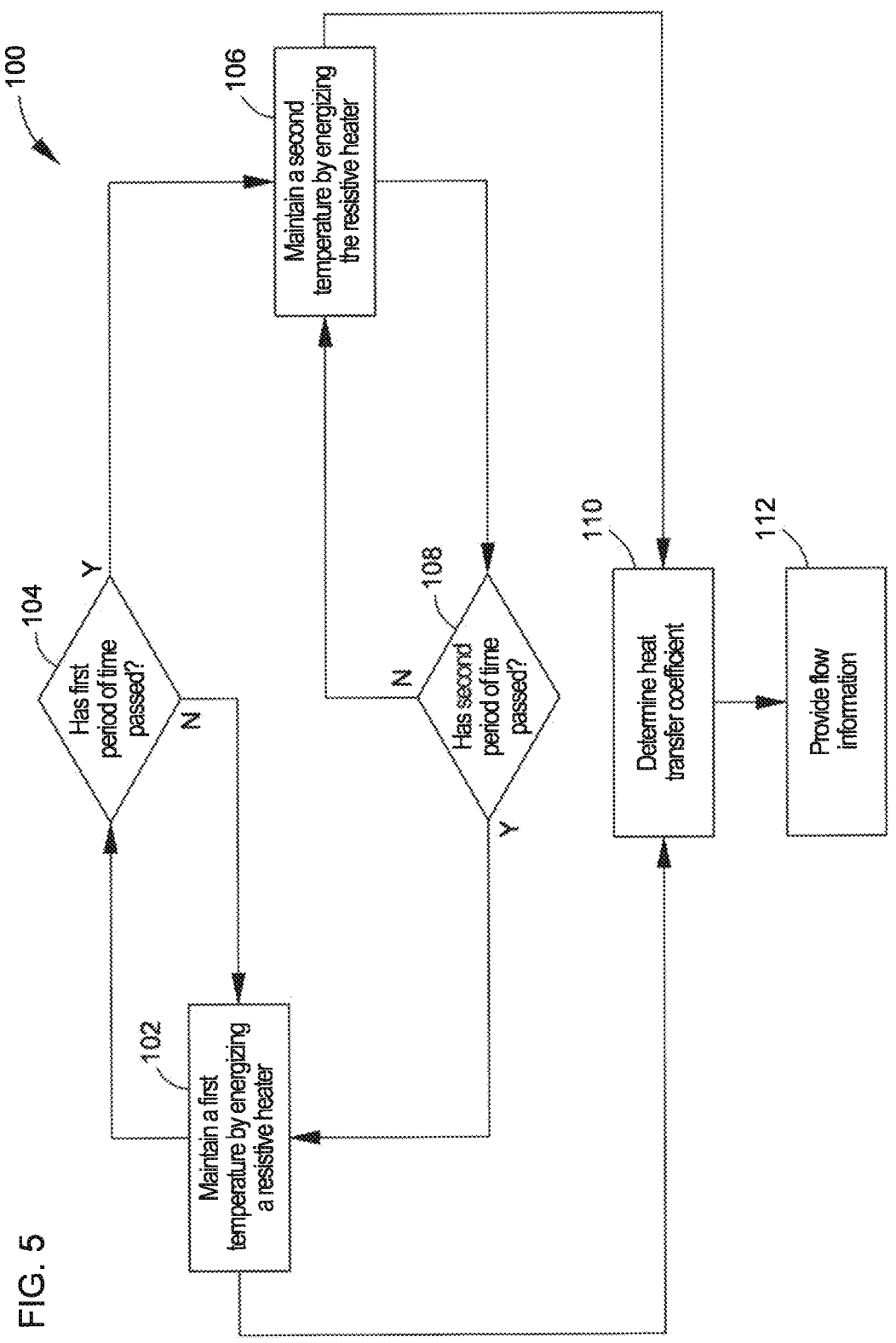
FIG. 5 is a flow chart illustrating an example method of determining a flow of cryogen exhaust gas in accordance with the present disclosure.

Turning now to FIG. 5, an embodiment of a method 100 of determining a flow of the cryogen exhaust gas 34 in the exhaust duct 32 is described. The description below describes the method embodiment 100 as performed by the flow probe assembly 50 discussed above. It should be appreciated, however, that the method may be performed by systems, apparatuses, assemblies and variations of all of the same as described herein for the present embodiments.

The method 100 is described as a series of steps, however, it should be appreciated that the method 100 may be continuously performed during the operation of the flow probe 52 to monitor a flow of the cryogen exhaust gas 34. Each step is described in a sequence below for purposes of illustrating the functionality that may occur at each step, but it will be appreciated that such description does not indicate that a certain starting or ending point is necessary. The method 100 may be continuously performed during operation of an industrial freezer 16, for example, to ensure proper and safe operation thereof.

The method 100 may include step 102, during which the flow probe control unit 70 may energize the resistive heater 62. The flow probe control unit 70 may use the flow probe control circuit 76 as previously described to apply and adjust a voltage to the resistive heater 62 to achieve a first operating temperature. The first operating temperature may be at or about a predetermined temperature threshold and/or within a predetermined temperature range of the predetermined threshold. The flow probe control unit 70 may continuously micro-adjust the voltage delivered to the resistive heater 62 in order to maintain the first operating temperature at or within the predetermined temperature range. Such micro-adjustment(s) may be utilized, for example, when the flow and/or temperature in the exhaust duct 32 are continuously (or near-continuously) changing. The first operating temperature may be various suitable operating temperatures to prevent and/or minimize the accumulation of ice or frozen food particles on the flow probe 52. The first operating temperature may be about 100° F. (38° C.), for example. In other examples, the first operating temperature may be other temperatures such as 105° F. (41° C.), 110° F. (43° C.), or 115° F. (46° C.).

At step 104, the flow probe control unit 70 may determine whether a first period of time has passed. As previously described, the resistive heater 62 may be operated at two or more different operating temperatures. The flow probe control unit 70 may maintain the resistive heater 62 at or near the first operating temperature for a predetermined period of time. Such periods of the time may be the same for each operating temperature. In one example, the periods of time may be about five minutes. In other examples, each period of time may have other lengths such as about 2 minutes or 1 minute. In still other examples, the period of time for the cycle may be about 20 seconds, 15 seconds, or 10 seconds. In other examples, the period of time for each cycle may be in a range of about 10 seconds to about 5 minutes. The flow probe control unit 70 may also determine the period of time based upon a determined heat transfer coefficient or cryogen gas velocity. When the flow probe control unit 70 determines that the first period of time has passed, the method may move to step 106 (A step 108 determines whether a second period of time has passed, as further discussed below). When the flow probe control unit 70 determines that the first period of time has not passed (e.g., during a duration of the first period of time), the method returns to step 102 and the flow probe control unit 70 continues to energize the resistive heater 62 and maintain the resistive heater 62 at or within a predetermined range of the first operating temperature.

During the first period of time (i.e., while the flow probe control unit 70 is maintaining the resistive heater 62 at the first operating temperature (or within a predetermined range thereof), the functionality shown at step 110 may be performed. For the step 110 to be performed, data from the steps 102, 106 must exist and therefore, the step 110 cannot be undertaken or actuated upon start-up of the method 100 until such time as when at least one loop of the steps 102, 104, 106, 108 has been completed. At step 110, the flow probe control unit 70 may determine a heat transfer coefficient at the resistive heater 62. The flow probe control unit 70 may determine the heat transfer coefficient as previously described above by measuring the voltage and the current applied to the resistive heater 62. The flow probe control unit 70 may, for example, utilize the measured operating parameters, Eq. 1, and other relationships described herein.

At step 106, the flow probe control unit 70 may energize the resistive heater 62 to achieve a second operating temperature. In some embodiments, the second operating temperature may comprise a temperature that is at or near an ambient temperature in the exhaust duct 32. In such embodiments, the flow probe control unit 70 may cause a nominal voltage to be applied to the resistive heater 62 and permit the resistive heater 62 to reach the ambient temperature in the exhaust duct 32. In other embodiments, the second operating temperature may comprise another elevated temperature that is different from the first operating temperature. In some embodiments, step 106 may be similar to step 102, except that the flow probe control unit 70 may utilize the flow probe control circuit 76 to adjust the voltage applied to the resistive heater 62 until the resistive heater 62 achieves the second operating temperature (or a temperature within a predetermined range thereof). The second operating temperature may be various suitable operating temperatures as previously described, except that the second operating temperature is different from the first operating temperature.

At step 108, the flow probe control unit 70 may determine whether a second period of time has passed. The flow probe control unit 70 may maintain the resistive heater 62 at the second operating temperature for the second period of time. The second period of time may be same as (or different from) the first period of time discussed above. When the flow probe control unit 70 determines that the second period of time has passed, the method may return to step 102. When the flow probe control unit 70 determines that the second period of time has not passed (e.g., during a duration of the second period of time), the method returns to step 106 and the flow probe control unit 70 continues to energize the resistive heater 62 and maintain the resistive heater 62 at or within a predetermined range of the second operating temperature.

While the resistive heater 62 is operating at the second operating temperature, the flow probe control unit 70 may, at step 110, determine the heat transfer coefficient at the resistive heater 62 in the exhaust duct 32. The flow probe control unit 70 may determine the heat transfer coefficient as previously described above. The flow probe control unit 70 may, for example, utilize the measured operating parameters, Eq. 2, and other relationships described herein. In some embodiments, the flow probe control unit 70 may utilize operating information currently being measured and/or stored operating information (e.g., obtained during other cycles or oscillations of the flow probe 52) to determine the heat transfer coefficient.

In some embodiments, the method 100 may include additional steps similar to the steps 102 and 106 in which the flow probe control unit 70 may energize the resistive heater 62 to a third operating temperature for a third period of time. The third operating temperature may also be sufficiently elevated to prevent or minimize the accumulation of ice and/or frozen food particles on the flow probe 52. The third operating temperature may be different from the first and second operating temperatures. The third period of time may be similar to and/or different from the first period of time and/or the second period of time. As described above, the flow probe control unit 70 may use the operating parameters and the three different operating temperatures to determine the heat transfer coefficient at step 110.

As further shown, the method 100 may also include step 112, during which the flow probe control unit 70 may provide flow information to another control system, to a database, or to a device for communication or display. The flow probe control unit 70 may, for example, determine a velocity of the cryogen exhaust gas 34. The velocity of the cryogen exhaust gas 34 may be determined using the heat transfer coefficient determined at step 110. This velocity information may be provided to the freezer control 44, for example. In other examples, other flow information such as temperatures, heat transfer coefficients, and/or velocities may be provided by the flow probe control unit 70 to other systems, components, devices, etc.

While not shown, the flow probe control unit 70 or other computing devices or controllers (e.g., freezer control 44) may compare the determined velocity of the cryogen exhaust gas 34 to a velocity threshold. The velocity threshold may be a predetermined velocity and may correspond to a velocity required to ensure that sufficient quantities of the cryogen exhaust gas 34 are being removed from the freezer 16 to a location external to the freezer 16 and/or external to the building 10. The flow probe control unit 70 (or other computing device or controller) may then determine, based on the comparison, whether those components responsible for expelling cryogen exhaust gas 34 (collectively, a cryogen exhaust system) are operating properly and evacuating the cryogen exhaust gas 34 from the freezer 16 and/or the building 10.

The flow probe control unit 70 (or other computing device or controller) may also determine whether the velocity of the cryogen exhaust gas 34 is greater than the velocity threshold. If the flow probe control unit 70 (or other computing device or controller) determines that the velocity of the cryogen exhaust gas 34 is greater than the velocity threshold, the flow probe control unit 70 (or other computing device or controller) may continue to monitor the velocity of the cryogen exhaust gas 34. If the flow probe control unit 70 (or other computing device or controller) determines that the velocity of the cryogen exhaust gas 34 is not greater than the velocity threshold, the flow probe control unit 70 (or other computing device or controller) may perform further functions to mitigate potential risk in the building 10.

For example, the flow information provided by the flow probe control unit 70 may be used to cause the cryogen control valve 30 to close the flow of cryogen 26 through the cryogen supply line 28 to the freezer 16. These actions may be performed by the freezer control 44, for example. If the flow information provided by the flow probe control unit 70 indicates that the velocity of the cryogen exhaust gas 34 is not greater than the velocity threshold, then it is possible that the cryogen exhaust system may not be operating properly, i.e., the exhaust duct 32 may be restricted, the blower 36 may not be operating properly, and/or other detrimental issues may have occurred. The freezer 16 may be operating inefficiently or the cryogen exhaust gas 34 may not be flowing through, or sufficiently through, the exhaust duct 32. In such circumstances, repair, maintenance, or some other remedial action may need to be taken. The flow information provided by the flow probe control unit 70 may, therefore, stop the flow of cryogen 26 by sending a signal to the cryogen control valve 30. The flow information provided by the flow probe control unit 70 may be utilized to initiate other actions as well such as, without limitation, sending a message or transmitting a signal to plant operators, stopping movement of warm food product 18 through the freezer 16, or other remedial actions.

Figure 6:
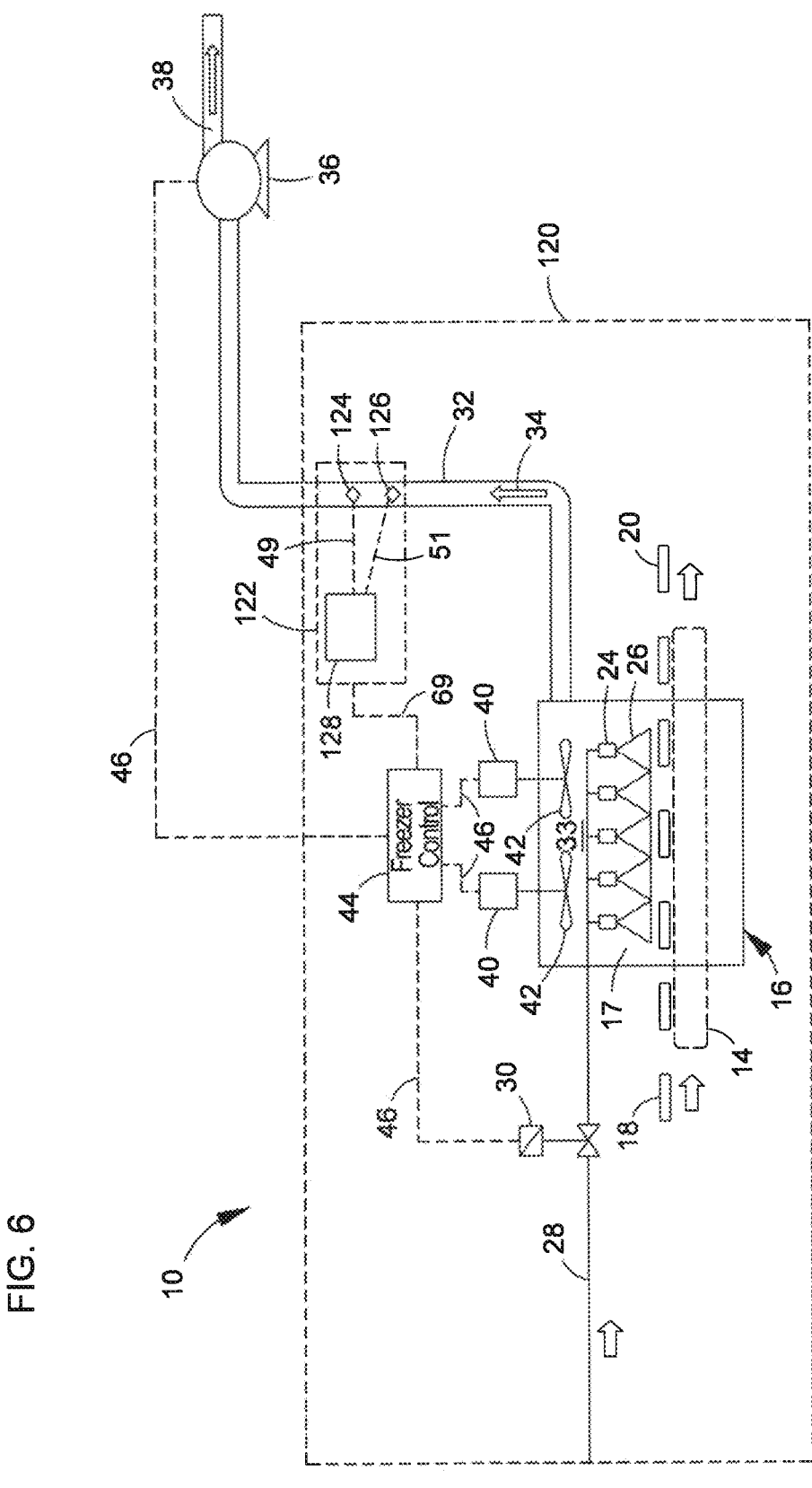
FIG. 6 is a schematic view of an example cryogenic processing environment that includes another embodiment of a probe apparatus in accordance with the present disclosure.

Referring now to FIG. 6, another example cryogenic processing environment 120 is shown. This example cryogenic processing environment 120 may be similar to the cryogenic processing environment 12 previously described and shown in FIG. 1. As a result, elements that are the same or similar amongst the two cryogenic processing environments 12,120 have been given matching reference numbers. For the sake of brevity, elements shown in FIG. 6 that are the same or similar to corresponding elements shown in FIG. 1 will not be described in detail again here. With that said, the building 10 in FIG. 6 may similarly include a cryogenic processing environment 120 that may enclose a freezer (or chiller) 16, such as an industrial freezer. Products, such as food products, may be conveyed through the freezer 16 via a conveyor 14 to transform warm (or ambient) food products 18 into frozen (or chilled) food products 20. The cryogen 26 that is used to rapidly remove heat from the ambient food products 18 operates at extremely low temperatures and must be vacated from the building 10. The cryogen exhaust gas 34 may be vacated from the building 10 through an exhaust duct 32 that extends from the freezer 16 to an exterior of the building 10. The cryogen exhaust gas 34 may then be expelled from the exhaust duct 32 through an exhaust outlet 38 that may be located externally to the building 10.

In one aspect, the cryogenic processing environment 120 shown in FIG. 6 differs from the that which is shown FIG. 1 in that this cryogenic processing environment 120 comprises a flow probe assembly 122 that includes more than one flow probe 124, 126. Indeed, the flow probe assembly 122 shown in FIG. 6 may include a first flow probe 124 and a second flow probe 126, each of which may be coupled to a dual flow probe control 128, as shown by broken lines 49 and 51, respectively. The dual flow probe control 128 may also differ from the flow probe control 54 previously described and shown in FIG. 1 in that the dual flow probe control 128 in this example may include elements to independently control the first flow probe 124 and the second flow probe 126. As will be further described below, the first flow probe 124 and the second flow probe 126 may each be configured to be operated and/or oscillated between different temperatures, and to collect information regarding operating conditions in the exhaust duct 32. This information can then be used to determine a heat transfer coefficient and, in turn, a velocity of the cryogen exhaust gas 34 flowing in the exhaust duct 32 away from freezer 16.

The flow probe assembly 122 in this example may perform functions similarly to those performed by flow probe assembly 50 discussed above in order to determine a velocity of the cryogen exhaust gas 34 in the exhaust duct 32. For instance, the flow probe assembly 122 in this example may continuously determine and/or monitor a velocity of the cryogen exhaust gas 34 to ensure that the cryogen exhaust gas 34 is being safely vacated from the building 10. As previously described, the extremely low temperatures of the cryogen exhaust gas 34 render the internal environment of the exhaust duct 32 a difficult location to operate sensors and/or monitoring equipment without a risk of failure and/or inaccurate measurements.

Notwithstanding their similarities, the flow probe assembly 122, in some examples, may operate differently from that of the flow probe assembly 50 previously described. For example, and as will be discussed further below, the flow probe assembly 122 shown in FIG. 6 may include a dual flow probe control 128 that operates the first flow probe 124 and the second flow probe 126 at different temperatures during a same period of time. The dual flow probe control 128 may then alternate the operating characteristics of the first flow probe 124 and the second flow probe 126 during subsequent time periods such that the flow probes 124, 126 remain out of phase with each other. Operating the flow probes 124, 126 in this manner ensures that ice or other debris does not accumulate on either flow probe 124, 126 and/or inhibit their proper and continuous operation.

As shown in FIG. 6, the dual flow probe control 128 may be coupled to the freezer control 44, as shown by flow probe signal line 69. In this manner, information from the dual flow probe control 128 may be communicated or otherwise sent to the freezer control 44 for operation of various components to which it is coupled. As further discussed below, the dual flow probe control 128 may, in some embodiments, comprise multiple flow probe control units. In such embodiments, the freezer control 44 may be involved in synchronizing operations of the multiple flow probe control units.

In some embodiments, the dual flow probe control 128 may be combined with the freezer control 44 such that the dual flow probe control 128 and the freezer control 44 are not separate devices but rather, are constructed and arranged as an integrated device. In other examples, the dual flow probe control 128 may be located at other locations relative to the exhaust duct 32 and/or the freezer control 44.

Figure 7A:
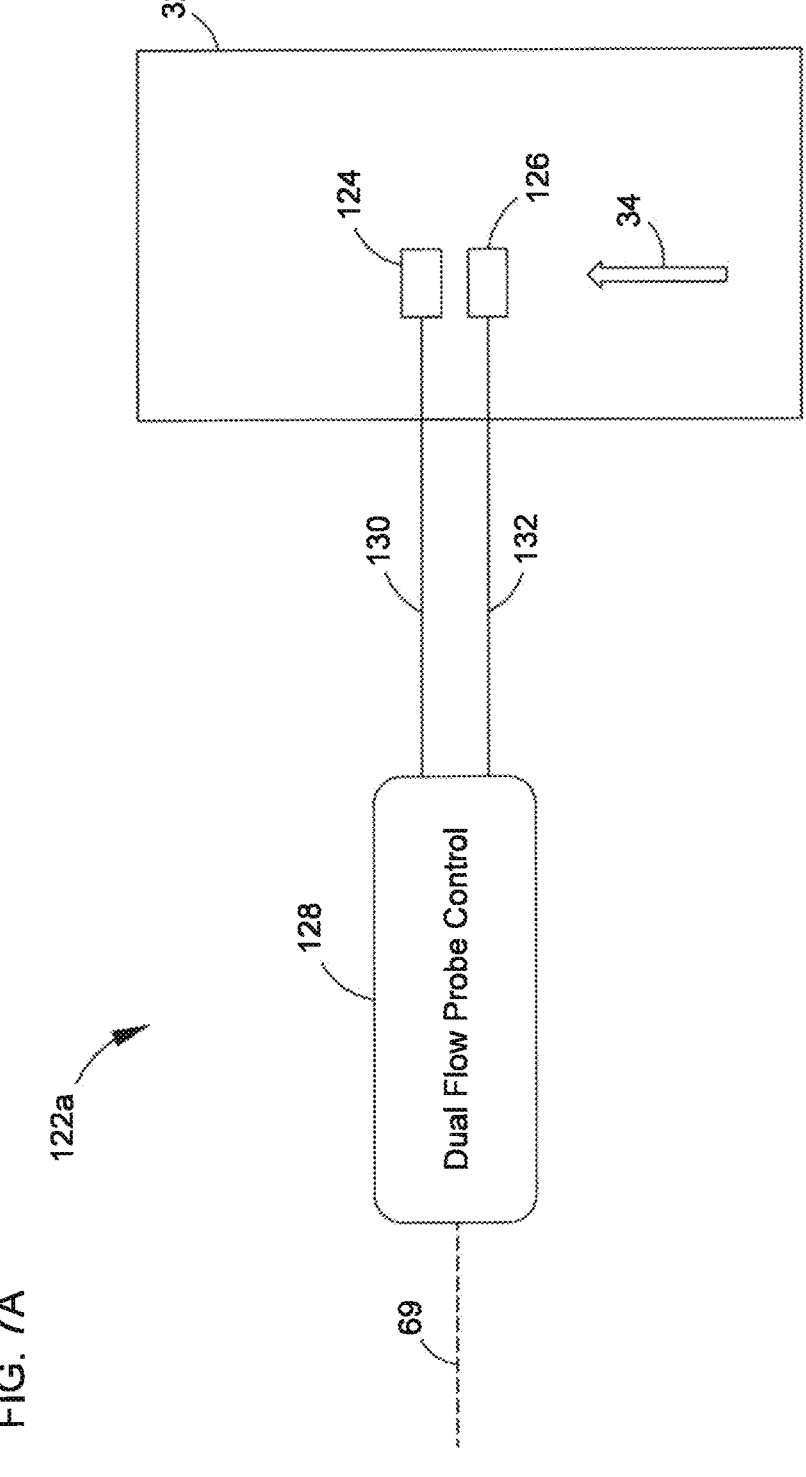
FIG. 7A is a schematic view of a portion of the cryogenic processing environment of FIG. 6 showing an example embodiment of a probe assembly.

Turning now to FIG. 7A, a schematic view of a portion of the first flow probe assembly 122a, an embodiment of 122 discussed above is shown. As shown, the first flow probe assembly 122a may include the first flow probe 124 and the second flow probe 126. The first flow probe 124 and the second flow probe 126 may be mounted in the exhaust duct 32 such that each flow probe 124, 126 is exposed to the cryogen exhaust gas 34 being moved from the freezer 16 through the exhaust outlet 38. Any suitable fasteners, adhesive, clips, hooks, or other attachments may be used to mount or adhere the flow probes 124, 126 in the exhaust duct 32. Positioning of the flow probes 124,126 relative to each other is such that spacing between the flow probes does not result in one of the flow probes influencing or impacting operation of the other one of the flow probes. The connection or coupling of the first flow probe 124 to the dual flow probe control 128 represented by broken line 49 in FIG. 6 may include one or more first control wires that may be positioned in a first control conduit 130 extending from and connecting the first flow probe 124 with the dual flow probe control 128. Similarly, the connection or coupling of the second flow probe 126 to the dual flow probe control 128 represented by broken line 51 in FIG. 6 may include one or more second control wires that may be positioned in a second control conduit 132 extending from and connecting the second flow probe 126 with the dual flow probe control 128. The first and second control wires may be configured to allow the transfer of power signals, information, or other electrical signals between the respective flow probes 124, 126 and the dual flow probe control 128.

In some examples, the first and second control wire(s) may both be positioned in a common control conduit. In other examples, the first and second control wire(s) may not be positioned inside a conduit and may operatively couple the flow probes 124, 126 to the dual flow probe control 128 without being positioned inside a tube or other routing member. Each control conduit 130, 132 may comprise a suitable tube or pipe through which signal lines and/or power lines may electrically connect one or more of the flow probe 124, 126 to the dual flow probe control 128. A flow probe signal line 69 may electrically connect the dual flow probe control 128 to the freezer control 44.

Figure 7B:
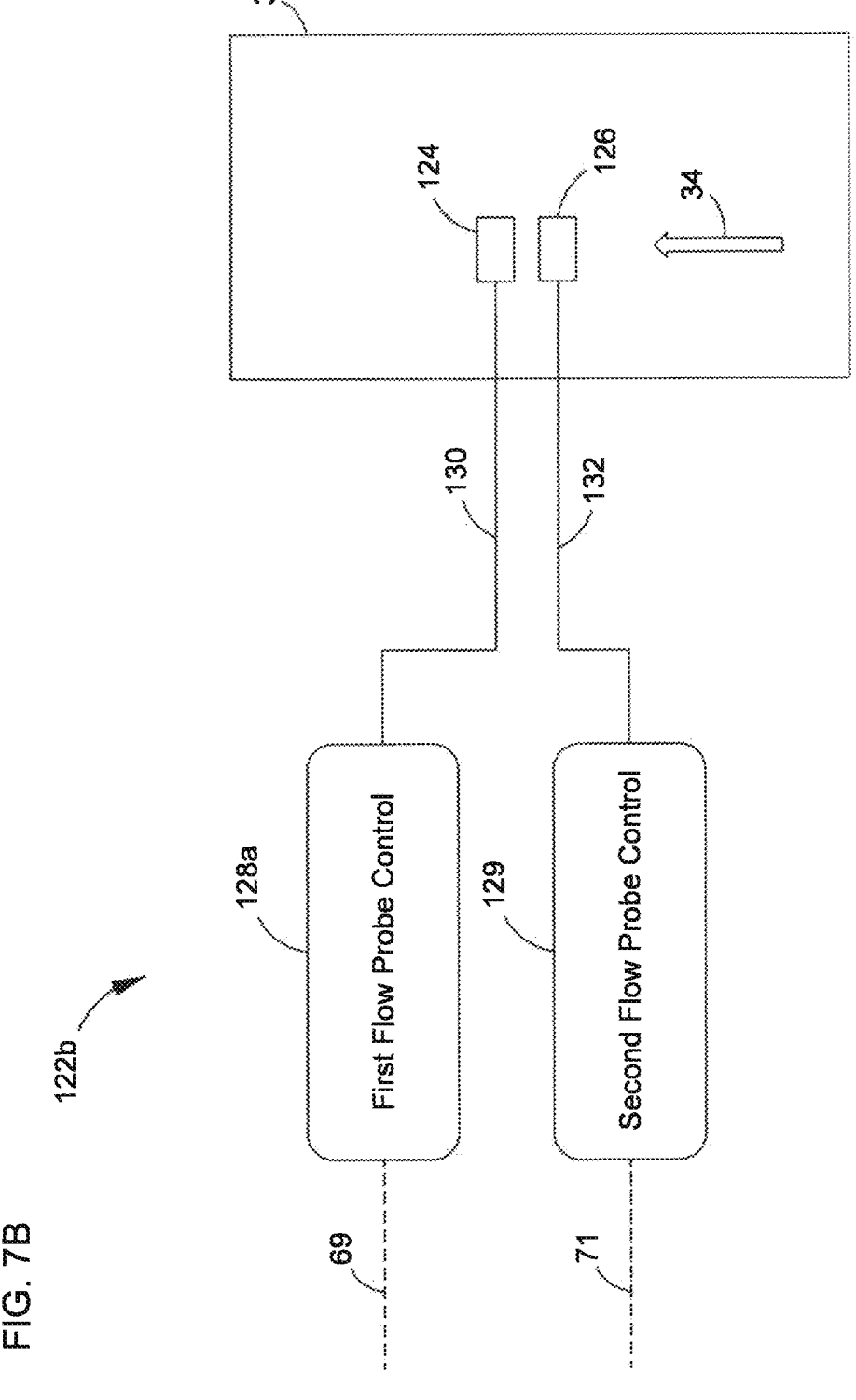
FIG. 7B is another schematic view of a portion of the cryogenic processing environment of FIG. 6 showing another example embodiment of a probe assembly.

Referring now to FIG. 7B, a schematic view of a portion of the flow probe assembly 122b, another embodiment of 122 discussed above is shown. In this example, the flow probe assembly 122b may include multiple flow probe controls, including a first flow probe control 128a and a second flow probe control 129. As in FIG. 7A, the first flow probe 124 and the second flow probe 126 may be mounted in the exhaust duct 32 such that each flow probe 124, 126 is exposed to the cryogen exhaust gas 34 being moved from the freezer 16 through the exhaust outlet 38, and positioning of the flow probes 124, 126 relative to each other is such that spacing between the flow probes does not result in one of the flow probes influencing or impacting operation of the other one of the flow probes. The connection or coupling of the first flow probe 124 to the flow probe control 128 represented by broken line 49 in FIG. 6 may include similarly one or more first control wires that may be positioned in a first control conduit 130 extending from and connecting the first flow probe 124 with the flow probe control 128a. However, the connection or coupling represented by broken line 51 in FIG. 6 now connects or couples the second flow probe 126 to the second flow probe control 129. This connection or coupling 51 may include one or more second control wires that may be positioned in a second control conduit 132 extending from and connecting the second flow probe 126 with the second flow probe control 129. A second flow probe signal line 71 may electrically connect the second flow probe control 129 to the freezer control 44.

Figure 8:
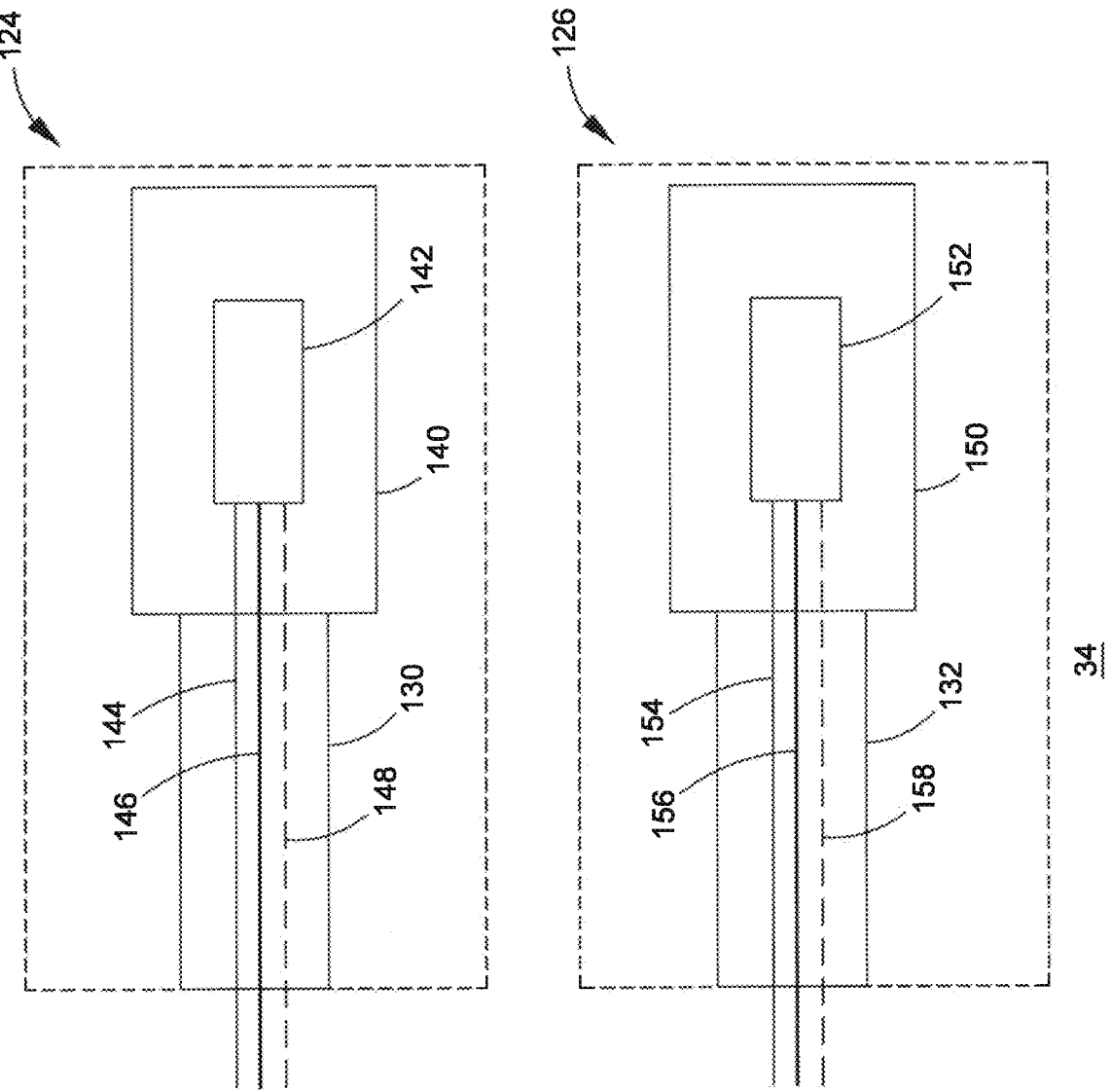
FIG. 8 is a schematic view showing further aspects of the probe assemblies of FIGS. 7A and 7B.

Referring now to FIG. 8, a schematic view showing further aspects of the first flow probe 124 and the second flow probe 126 are shown. Both of the first flow probe 124 and the second flow probe 126 are shown exposed to cryogen exhaust gas 34 in the exhaust duct 32. The first flow probe 124 and the second flow probe 126 may be configured similarly and each may have substantially the same configuration. The first flow probe 124 and the second flow probe 126 may each have a configuration and structure similar to the flow probe 52 depicted in FIG. 3 and previously described.

The first flow probe 124 may include a flow probe enclosure 140 and a first resistive heater 142. The first flow probe enclosure 140 may surround the resistive heater 142. The first resistive heater 142 may be connected to the first flow probe enclosure 140 using a conductive adhesive or other suitable fastener or attachment. The first resistive heater 142 and the first flow probe enclosure 140 may be positioned within the exhaust duct 32 so that the first resistive heater 142 is exposed to the cryogen exhaust gas 34 moving through the exhaust duct 32 and away from the freezer 16. The first resistive heater 142 may be electrically coupled to the flow probe control 128a (not shown in FIG. 8) via one or more wires or lines positioned inside the first flow probe conduit 130. While the first flow probe conduit 130 may not be required, the first flow probe conduit 130 may be utilized to guide and support the wires or lines electrically coupling the first flow probe 124 to the flow probe control 128, 128a.

In the example shown, a first control wire 144, a second control wire 146, and a flow probe signal line 148 may extend through the first flow probe conduit 130. The first control wire 144 and the second control wire 146 may electrically couple the first resistive heater 142 to a power source (not shown) to energize the first resistive heater 142. The first control wire 144 and the second control wire 146 may also be used to collect information regarding the operating conditions of the first resistive heater 142. The flow probe signal line 148 is an optional wire or line that may be included to provide information from the first flow probe 124 to the flow probe control 128,128a. For example, to mitigate the resistance of the first and second control wires 144, 146 if and when the distance between the flow probe 124 and the flow probe control 128,128a is excessive, this third control wire or flow probe signal line 148 may be included to provide a suitable signal for the collection of information. In other examples, additional wires or lines may be included such as additional signal lines from the first flow probe 124.

The second flow probe 126 may be configured similarly to the first flow probe 124 described above. The second flow probe 126 may include a flow probe enclosure 150 and a second resistive heater 152. The second flow probe enclosure 150 may surround the second resistive heater 152. The second resistive heater 152 may be connected to the second flow probe enclosure 150 using a conductive adhesive or other suitable fastener or attachment. The second resistive heater 152 and the second flow probe enclosure 150 may be positioned within the exhaust duct 32 so that the second resistive heater 152 is exposed to the cryogen exhaust gas 34 moving through the exhaust duct 32 and away from the freezer 16. The second resistive heater 152 may be electrically coupled to the flow probe control 128,129 via one or more wires or lines positioned inside the second flow probe conduit 132. While the second flow probe conduit 132 may not be required, the second flow probe conduit 132 may be utilized to guide and support the wires or lines electrically coupling the second flow probe 126 to the flow probe control 128, 129.

In this example shown, a third control wire 154, a fourth control wire 156, and a second flow probe signal line 158 may extend through the second flow probe conduit 132. The third control wire 154 and the fourth control wire 156 may electrically couple the second resistive heater 152 to a power source (not shown) to energize the second resistive heater 152. The third control wire 154 and the fourth control wire 146 may also be used to collect information regarding the operating conditions of the second resistive heater 152. The flow probe signal line 158 is an optional line that may be included to provide information from the second flow probe 126 to the flow probe controls 128,129. In other examples, additional wires or lines may be included such as additional signal lines from the second flow probe 126.

Figure 9A:
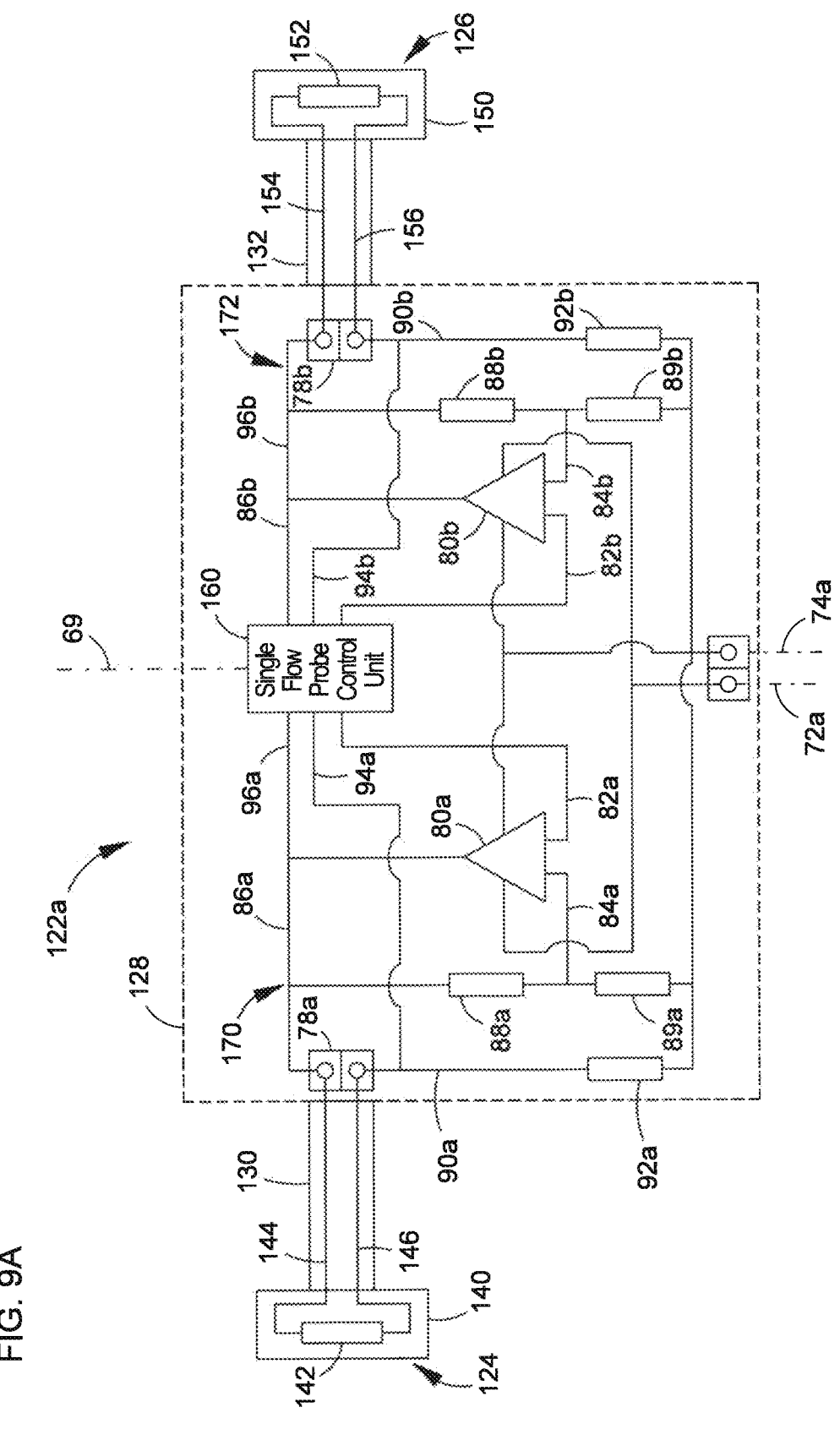
FIG. 9A is a circuit diagram of an example circuit that may be used in the probe apparatus of FIG. 7A.
Figure 9B:
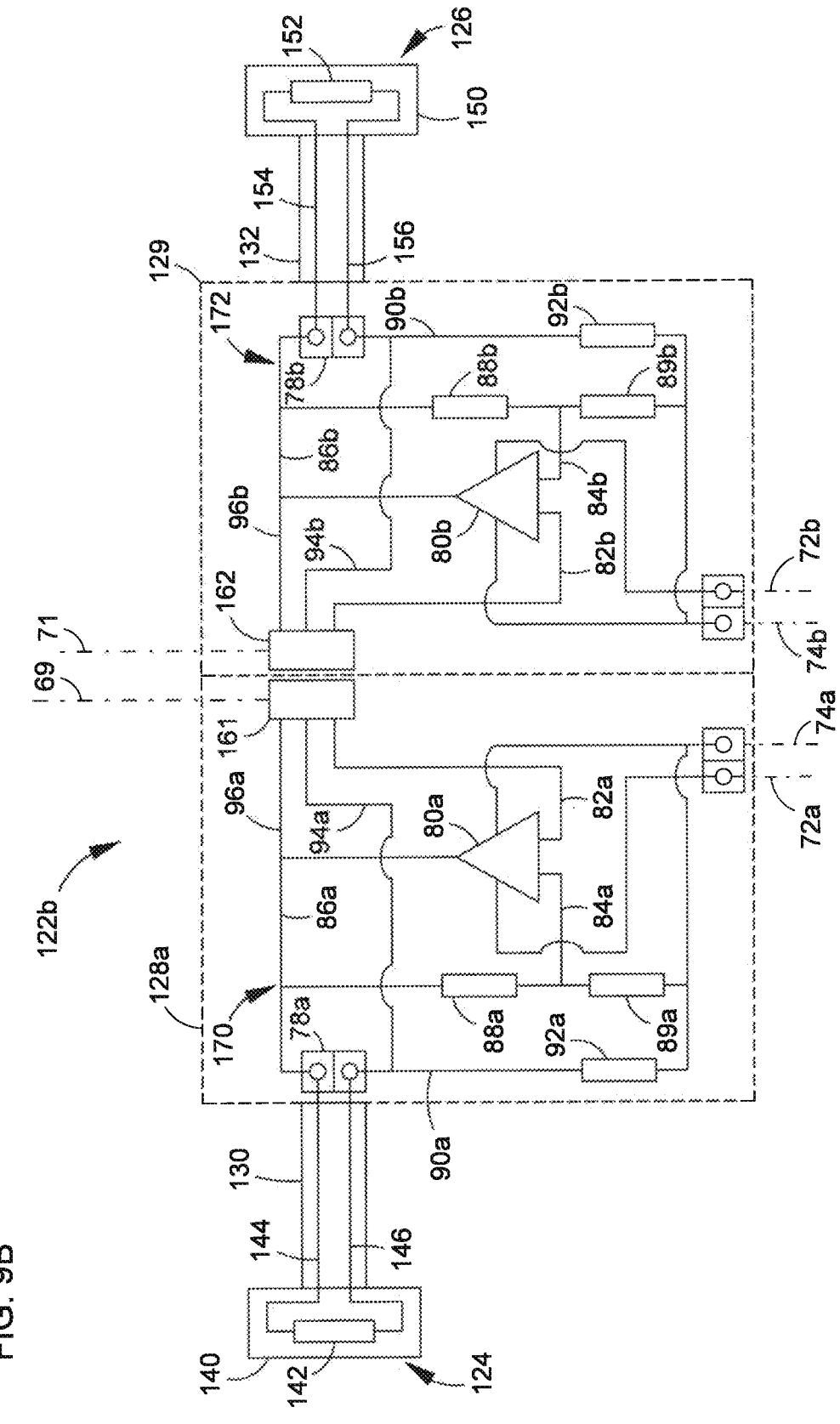
FIG. 9B is a circuit diagram of an example circuit that may be used in the probe apparatus of FIG. 7B.

Referring now to FIGS. 9A and 9B, example embodiments of flow probe assemblies 122a and 122b, respectively, are shown. The example embodiment of flow probe assembly 122a shown in FIG. 9A illustrates a first flow probe control 128 comprising a single flow probe control unit 160 for operating two flow probes 124, 126, as discussed above with reference to FIG. 7A. The example embodiment of flow probe assembly 122b shown in FIG. 9B, on the other hand, illustrates dual flow probe controls (e.g., the first flow probe control 128a and a second flow probe control 129), each comprising a respective one of flow probe control units 161, 162, and each configured to control a respective flow probe 124, 126, as discussed above with reference to FIG. 7B.

In the example flow probe assembly 122a shown in FIG. 9A, the single flow probe control unit 160 may be coupled to both a first flow probe control circuit 170 and to a second flow probe control circuit 172. Conversely, in the example flow probe assembly 122b shown in FIG. 9B, the first flow probe control unit 161 may be coupled to the first flow probe control circuit 170, while the second flow probe control unit 162 may be coupled to the second flow probe control circuit 172.

As also shown in FIGS. 9A and 9B, the single flow probe control unit 160 may be coupled to the freezer control (not shown) by the first flow probe signal wire 69 (FIG. 7A), and as shown in FIG. 9B the second flow probe control unit 162 may be coupled to the freezer control (not shown) by the second flow probe signal wire 71 (FIG. 7B).

Referring again to FIG. 9A, the flow probe assembly 122a may include the first flow probe control circuit 170 that may be coupled to the first flow probe 124 by two or more control wires. In this embodiment, the first flow probe 124 is shown coupled to the first flow probe control circuit 170 by a first control wire 144 and a second control wire 146. The first control wire 144 and the second control wire 146 may be positioned inside the conduit 130. As noted above, the conduit 130 may comprise a tube, pipe or other material through which the first control wire 144 and the second control wire 146 can be guided and supported.

The second flow probe control circuit 172 may similarly be coupled to the second flow probe 126 by two or more control wires, namely, a third control wire 154 and a fourth control wire 156. The third control wire 154 and the fourth control wire 156 may be positioned inside the second conduit 132, as described above.

The dual flow probe control 128 may include the single flow probe control unit 160, which is coupled to the first flow probe control circuit 170 and the second flow probe control circuit 172. A flow probe signal line 69 may transfer information obtained from the single flow probe control unit 160, the first flow probe 124 and/or the second flow probe 126 to the freezer control 44 (FIG. 1). A positive or first power line 72a and a negative or second power line 74a may feed into the dual flow probe control 128 to provide a power signal to the first flow probe control circuit 170, the second flow probe control circuit 172, the first flow probe 124 and the second flow probe 126, as will be further discussed below.

The single flow probe control unit 160 may include a processor, memory and computer-readable instructions, and may be configured as a computing device, application specific circuit, programmable logic controller (PLC) or other suitable controller. The single flow probe control unit 160 may operate to cause a voltage to be delivered to the first resistive heater 142 within the first flow probe 124, and to the second resistive heater 152 within the second flow probe 126. In response, the first flow probe 124 and/or the second flow probe 126 may be heated to a temperature greater than the predetermined threshold temperature as previously described. The single flow probe control unit 160 may also obtain information such as voltage, current, or other information from the first and second flow probes 124, 126 to determine an ambient temperature within the exhaust duct 32 and a heat transfer coefficient between the respective flow probes 124, 126 and the cryogen exhaust gas 34 that may surround the flow probes 124, 126 in the exhaust duct 32. The heat transfer coefficient may then be used to determine a velocity of the cryogen exhaust gas 34 flowing through the exhaust duct 32.

As noted above, the first flow probe 124 and the second flow probe 126 may each include a respective resistive heater 142, 152. The first resistive heater 142 may be coupled to the first control wire 144 and the second control wire 146, and the second resistive heater 152 may be coupled to the third control wire 154 and the fourth control wire 156. The resistive heaters 142, 152 may be made of a known material with a known relationship between temperature and resistance. As further discussed below, this known relationship may be leveraged to determine a temperature at the respective resistive heaters 142, 152.

Each of the resistive heaters 142, 152 may be positioned within a respective flow probe enclosure 140, 150. The first control wire 144 and the second control wire 146 may electrically couple the first resistive heater 142 to the first flow probe control circuit 170, and the third control wire 154 and the fourth control wire 156 may electrically couple the second resistive heater 152 to the second flow probe control circuit 172. A respective screw terminal 78a, 78b may couple the first and second control wires 144, 146 to the first flow probe control circuit 170, as well as the third and fourth control wires 154, 156 to the second flow probe control circuit 172. In other examples, other suitable connectors and/or connections can be used.

The single flow probe control unit 160 may independently control operation of the first flow probe 124 and the second flow probe 126. The single flow probe control unit 160 may oscillate operations of the first flow probe 124 and the second flow probe 126 between a temperature sensing mode and a heat flux mode. In the temperature sensing mode, the first flow probe 124 or the second flow probe 126 may operate at or near an ambient temperature to determine a temperature of the ambient cryogen exhaust gas 34 at the flow probe 124, 126. In the heat flux mode, the first flow probe 124 or the second flow probe 126 may be operated at an elevated temperature to determine an energy loss that, in turn, may be used to determine the heat transfer coefficient at the respective flow probe 124, 126. When the first flow probe 124 or the second flow probe 126 is being operated in the heat flux mode, the elevated temperature of this operating mode prevents and/or minimizes the accumulation of ice or other frozen particles on the respective flow probe 124, 126 which, as noted above, may cause damage and inhibit proper operation of the probes 124, 126. Thus, by oscillating each of the first flow probe 124 and the second flow probe 126 (with each probe in a different mode at any given time)

between the temperature sensing mode and the heat flux mode, neither probe 124, 126 remains operating at an ambient temperature for an extended period of time. This, in turn, avoids the accumulation of ice and debris (as well as their detrimental effects) on the probes 124, 126. As a result, both probes 124, 126 may operate properly and without interruption to collect accurate information for continuously determining the heat transfer coefficient of the cryogen exhaust gas 34 during operation of the freezer 16.

During a first period of time, the single flow probe control unit 160 may cause the first flow probe 124 to operate in the heat flux mode of operation and the second flow probe 126 to operate in the temperature sensing mode of operation. To operate the first flow probe 124 in the heat flux mode, the single flow probe control unit 160 may cause a voltage (V) to be applied to the first resistive heater 142 of the first flow probe 124 using the first flow probe control circuit 170. The first flow probe control circuit 170 may operate as previously described to incrementally adjust the voltage in order to achieve a predetermined first temperature ($T_{HOT}$). The predetermined first temperature ($T_{HOT}$) may be a temperature greater than a predetermined temperature threshold. The predetermined temperature threshold may be a temperature greater than 100° F. (38° C.). In other examples, the predetermined temperature threshold may comprise other temperatures sufficient to prevent accumulation of ice or other frozen debris.

The single flow probe control unit 160 may also measure a current (I) passing through the first resistive heater 142. The values of the voltage (V) and the current (I) may then be used by the single flow probe control unit 160 to determine a resistance (R) of the first resistive heater 142. The single flow probe control unit 160 may also use these values to determine a power (Q) lost by the first resistive heater 142. With the resistance (R), the single flow probe control unit 160 may determine the temperature ($T_{HOT}$) of the first resistive heater 142.

The single flow probe control unit 160 may further be configured to determine the heat transfer coefficient (U) at the first resistive heater 142 using Eq. 2. According to Eq. 2, an ambient temperature of the cryogen exhaust gas 34 at the first flow probe 124 and/or the second flow probe 126 ($T_{COLD}$) may also need to be determined or measured. In order to determine $T_{COLD}$, the single flow probe control unit 160 may cause a nominal voltage to be applied to the second resistive heater 152 of the second flow probe 126. The nominal voltage may correspond to a voltage low enough such that a temperature of the second resistive heater 152 corresponds to the temperature of the ambient cryogen exhaust 34. In some examples, the nominal voltage may be less than about 2 Volts. In other examples, the nominal voltage may be less than about 1 Volt. In other example, the nominal voltage may have other values.

After the nominal voltage is applied to the second resistive heater 152, the single flow probe control unit 160 may measure the current (I) through the second resistive heater 152. Using the voltage (V) and the current (I), the single flow probe control unit 160 may determine a resistance of the second resistive heater 152 and, in turn, the temperature of the second resistive heater 152 that corresponds to $T_{COLD}$. The single flow probe control unit 160 may then determine the heat transfer coefficient (U) using Eq. 2. Upon determining the heat transfer coefficient (U), a velocity of the cryogen exhaust gas 34 may be derived. Notably, the operation of the second flow probe 126 to determine $T_{COLD}$ as described above corresponds to operation of the second flow probe 126 in the temperature sensing mode of operation.

The single flow probe control unit 160 may operate the first flow probe 124 in the heat flux mode of operation and the second flow probe 126 in the temperature sensing mode of operation for the first period of time. The single flow probe control unit 160 may then switch the operation of the flow probes 124, 126, and operate the first flow probe 124 in the temperature sensing mode of operation and the second flow probe 126 in the heat flux mode of operation for a second period of time. Then, the single flow probe control unit 160 may switch the operation of the flow probes 124, 126 again and operate the first flow probe 124 in the heat flux mode of operation and the second flow probe 126 in the temperature sensing mode of operation for a third period of time. The single flow probe control unit 160 may continue to switch or oscillate the operation of the flow probes 124, 126 (e.g., back and forth between heat flux mode and temperature sensing mode) continuously and indefinitely. In this manner, the single flow probe control unit 160 may ensure the proper and uninterrupted operation of both flow probes 124, 126, which will enable them to continuously determine and monitor the velocity of the cryogen exhaust gas 34 in the exhaust duct 32, for example, to ensure that the cryogen exhaust gas 34 is being safely vacated from the industrial freezer 16 and/or from the cryogenic processing environment 12.

The first period of time and the second period of time during which the respective operating modes of the first flow probe 124 and the second flow probe 126 are alternated (e.g., between the heat flux mode of operation and the temperature sensing mode of operation) may comprise any suitable time periods to ensure that the flow probes 124, 126 do not remain operating in the temperature sensing mode for an extended amount of time. In this manner, accumulation and the detrimental effects of ice or other frozen particles may be avoided. In some examples, the first period of time and the second period of time may each correspond to about 5 minutes. In other examples, the first period of time and the second period of time may each correspond to a time in a range of about 2 minutes to about 10 minutes. In still other examples, the first period of time and the second period of time may each correspond to a time of less than about 1 minute. In yet other examples, other time periods may be used. Further still, the periods of time need not be equal.

As described above, the single flow probe control unit 160 and the first and second flow probe control circuits 170, 172 are designed to not only measure the voltage (V) across the resistive heaters 142, 152 and the current (I) passing through the resistive heaters 142, 152, but also to determine the heat transfer coefficient (U) and to control the voltage (V) across the resistive heaters 142, 152. In this manner, the single flow probe control unit 160 may oscillate the resistive heater 142, 152 between any number of different temperatures. For example, in order to achieve a desired temperature in the first resistive heater 142, the single flow probe control unit 160 may cause a nominal voltage to be applied to an operational amplifier 80a via an upper voltage control wire 82a within the first flow probe control circuit 170. The operational amplifier 80a may compare the nominal voltage with a voltage in the lower voltage control wire 84a. The operational amplifier 80a may then generate a voltage in an upper voltage wire 86a in order to change the voltage in the upper voltage wire 86a such that the voltage in the lower voltage control wire 84a and the voltage in the upper voltage control wire 82a are the same. The single flow probe control unit 160 may similarly achieve desired temperatures in the second resistive heater 152, using corresponding elements of the second flow probe control circuit 172 (e.g., operational amplifier 80*b*, upper voltage control wire 82*b*, lower voltage control wire 84*b*, upper voltage wire 86*b*, etc.).

In some embodiments, the first flow probe control circuit 170 may also include a voltage divider configured as a first resistor 88*a* and a second resistor 89*a*. The voltage divider may enable the voltage in the upper voltage control wire 82*a* to be lower than the voltage in the upper voltage wire 86*a*.

As shown in the first flow probe control circuit 170, the upper voltage wire 86*a* may be coupled to the first control wire 144 (e.g., via screw connector 78*a* or other connector, for example). The second control wire 146 may be coupled to the lower voltage wire 90*a* (via the screw connector 78*a* or other connector, for example). The lower voltage wire 90*a* may then be coupled to a lower voltage resistor 92*a* having a known resistance, and the lower voltage resistor 92*a* may be coupled to the negative power line 74*a*. As a result, voltage in the upper voltage wire 86*a* is able to force a current (I) to flow through both the first resistive heater 142 and the lower voltage resistor 92*a*. In this manner, the first flow probe control circuit 170 is able to energize the first resistive heater 142 as desired.

Similarly, as shown in the second flow probe control circuit 172, the upper voltage wire 86*b* may be coupled to the third control wire 154 (e.g., via screw connector 78*b* or other connector, for example). The fourth control wire 156 may be coupled to the lower voltage wire 90*b* (via the screw connector 78*b* or other connector, for example). The lower voltage wire 90*b* may then be coupled to a lower voltage resistor 92*b* having a known resistance, and the lower voltage resistor 92*b* may be coupled to the negative power line 74*a*. As a result, voltage in the upper voltage wire 86*b* is able to force a current (I) to flow through both the second resistive heater 152 and the lower voltage resistor 92*b*. In this manner, the second flow probe control circuit 172 is able to energize the second resistive heater 152 as desired.

An upper voltage sensing wire 96*a* of the first flow probe control circuit 170 may provide the voltage ($V_1$) of the upper voltage wire 86*a* to the single flow probe control unit 160, and a lower voltage sensing wire 94*a* of the first flow probe control circuit 170 may provide the voltage ($V_2$) of the lower voltage wire 90*a* (e.g., the voltage between the first flow probe 124 and the lower voltage resistor 92*a*) to the single flow probe control unit 160. Based on these voltages ($V_1$ and $V_2$), the single flow probe control unit 160 may then determine a current (I) flowing through the first resistive heater 142, since the resistance ($R_2$) of the lower voltage resistor 92*b* is known (e.g., via equation $V_2=I\ R_2$). The single flow probe control unit 160 may also determine the voltage ($V_3$) across the first resistive heater 142 as a difference between the voltages ($V_3=V_1-V_2$) provided by the upper voltage sensing wire 96*a* and the lower voltage sensing wire 94*a*. Given that the relationship between the resistance of the first resistive heater 142 and its temperature is known, the dual flow probe control unit 160 may determine a temperature ($T_{HOT}$) of the first flow probe 124. The single flow probe control unit 160 may similarly control the second flow probe control circuit 172 to determine a temperature ($T_{HOT}$) of the second flow probe 126 using corresponding elements (e.g., upper voltage sensing wire 96*b*, lower voltage sensing wire 94*b*, upper voltage wire 86*b*, lower voltage wire 90*b*, lower voltage resistor 92*b*, etc.)

In some embodiments, each of the first flow probe control circuit 170 and the second flow probe control circuit 172 may include similar circuitry and elements, and therefore operate similarly, to the flow probe control circuit 76 previously discussed and depicted in in FIG. 4.

Turning now to FIG. 9B, a second example flow probe assembly 122*b* is shown. In this example, rather than utilizing the single flow probe control unit 160 (as in the first flow probe assembly 122*a* depicted in FIG. 9A), the second flow probe assembly 122*b* comprises respective flow probe control units 161, 162. As discussed above, a first flow probe control unit 161 may be coupled to the first flow probe control circuit 170, while a second flow probe control unit 162 may be coupled to the second flow probe control circuit 172. Notwithstanding the existence of the two flow probe control circuits 170, 172, all other elements and/or operations of this second flow probe assembly 122*b* may be the same as or similar to those of the first flow probe assembly 122*a* discussed above. As a result, those elements that are common among the two flow probe control circuits 170, 172 have been given the same reference numbers.

As a caveat, rather than the single flow probe control unit 160 controlling operations of both the first and second flow probe control circuits 170, 172, the first and second flow probe control units 161, 162 instead operate cooperatively to control the respective operations of the first and second flow probe control circuits 170, 172, and of the first and second flow probes 124, 126. As used herein, "cooperatively" does not include transfer of information between the first and second flow probe control units 161,162, although during operation such flow probe control units achieve a common goal of supplying information to a suitable processing device, such as for example the freezer control 44, wherein the heat transfer coefficient is derived. Thus, for the sake of brevity, descriptions of elements and operations of the second flow probe assembly 122*b* that are similar or common to those of the first flow probe assemblies 122*a* are not repeated here.

Figure 10:
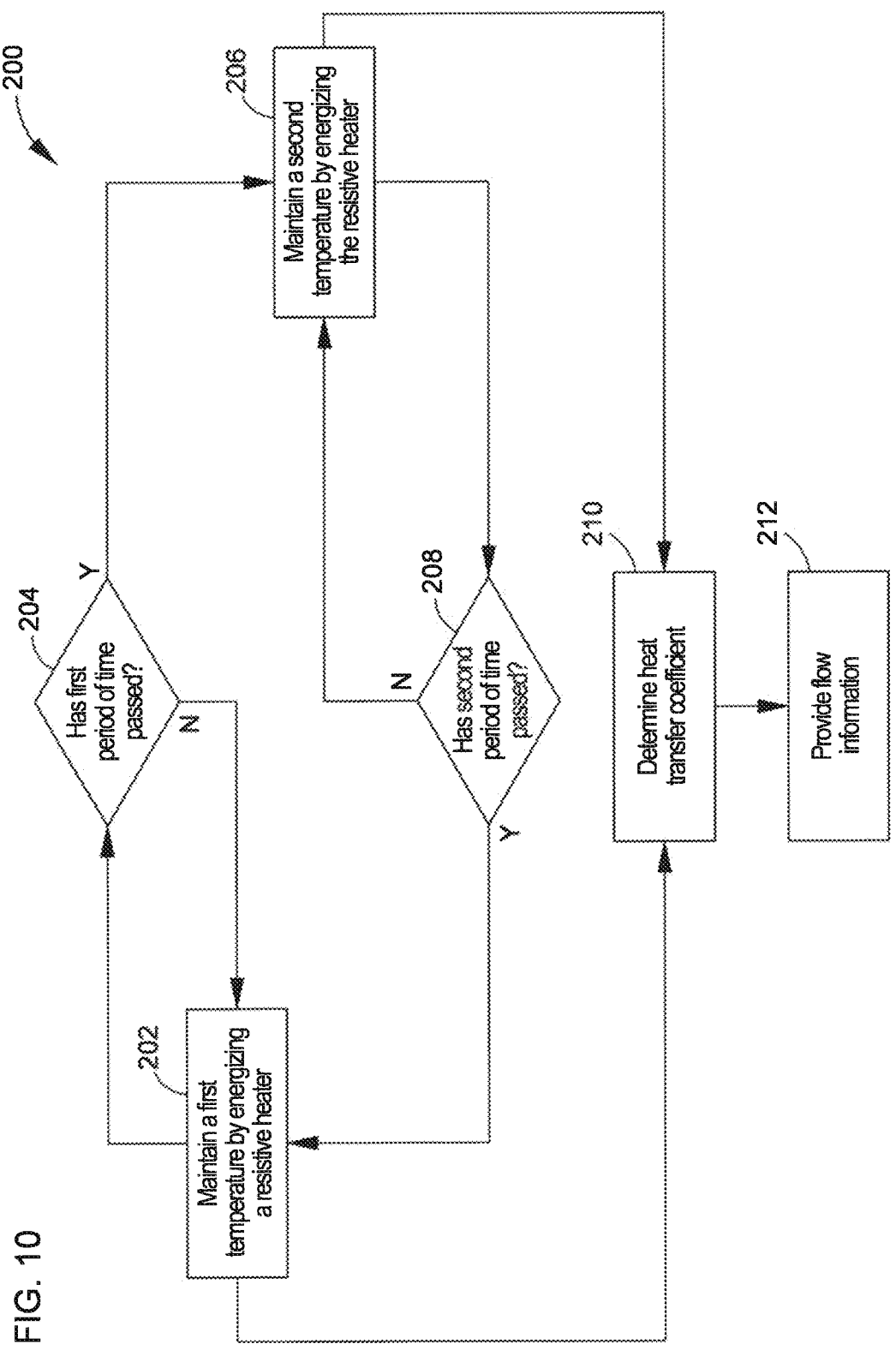
FIG. 10 is a flow chart illustrating an example method of determining a flow of a cryogen exhaust gas in accordance with the present disclosure.

FIG. 10 will now be described with respect to the disclosures of FIGS. 9A and 9B.

Referring now to FIG. 10, an exemplary method 200 of determining a flow of the cryogen exhaust gas 34 in the exhaust duct 32 is shown. For purposes of this example, the method 200 is described as being performed by the first flow probe assembly 122*a* shown in FIG. 9A. It should be appreciated, however, that the method 200 may also be performed by other flow probe assemblies, such as the second flow probe assembly 122*b* of FIG. 9B or other assemblies that include two or more flow probes according to this disclosure.

The method 200 is described as a series of steps, however, it should be appreciated that the method 200 may be continuously performed during the operation of the first flow probe assembly 122*a* to monitor a flow of the cryogen exhaust gas 34. Each step is described in a sequence below for purposes of illustrating the functionality that may occur at each step, but it will be appreciated that such description does not indicate that a certain starting or ending point is necessary. The method 200 may be continuously performed during operation of an industrial freezer 16, for example, to ensure proper and safe operation thereof.

The method 200 may include step 202, during which the single flow probe control unit 160 may energize the first resistive heater 142. The single probe control unit 160 may use the first flow probe control circuit 170 as previously described to apply and adjust a voltage to the first resistive heater 142 to achieve a first operating temperature. The first operating temperature may be at or about a predetermined temperature threshold and/or within a predetermined temperature range of the predetermined threshold. The single flow probe control unit 160 may continuously micro-adjust the voltage delivered to the first resistive heater 142 in order to maintain the first operating temperature at or within the predetermined temperature range. Such micro-adjustment(s) may be utilized, for example, when the flow and/or temperature in the exhaust duct 32 are continuously (or near-continuously) changing. The first operating temperature may be various suitable operating temperatures to prevent and/or minimize the accumulation of ice or frozen food particles on the first flow probe 124. The first operating temperature may be about 100° F. (38° C.), for example. In other examples, the first operating temperature may be other temperatures such as 105° F. (41° C.), 110° F. (43° C.), or 115° F. (46° C.).

At step 204, the single flow probe control unit 160 may determine whether a first period of time has passed. As previously described, the first resistive heater 142 may be operated at two or more different operating temperatures. The single flow probe control unit 160 may maintain the resistive heater 142 at or near the first operating temperature for a predetermined period of time. Such periods of the time may be the same for each operating temperature. In one example, the periods of time may be about five minutes. In other examples, each period of time may have other lengths such as about 2 minutes or 1 minute. In still other examples, the period of time for the cycle may be about 20 seconds, 15 seconds, or 10 seconds. In other examples, the period of time for each cycle may be in a range of about 10 seconds to about 5 minutes. When the single flow probe control unit 160 determines that the first period of time has passed, the method may move to step 206 (A step 208 determines whether a second period of time has passed, as further discussed below). When the single flow probe control unit 160 determines that the first period of time has not passed (e.g., during a duration of the first period of time), the method 200 returns to step 202 and the single flow probe control unit 160 continues to energize the first resistive heater 142 and maintain the first resistive heater 142 at or within a predetermined range of the first operating temperature.

Also occurring during the first period of time (i.e., while the single flow probe control unit 160 is maintaining the first resistive heater 142 at the first operating temperature (or within a predetermined range thereof)), the single flow probe control unit 160 may simultaneously energize the second resistive heater 152 to achieve or maintain the second resistive heater 152 at (or within a predetermined range of) a second operating temperature that is out of phase with the first operating temperature. As described above, this second operating temperature may be an ambient operating temperature, that is, an operating temperature that approximates a temperature of the cryogen exhaust gas 34 in the exhaust duct 32. As further discussed below, the freezer control 44 may alternate the operating temperatures of the respective resistive heaters 142, 152 during the first and subsequent time periods, so as to maintain such operating temperatures out of phase.

Contrary to the method 100 previously described, even during a first cycle of the method 200, the single flow probe control unit 160 may determine a heat transfer coefficient (step 110) at the first flow probe 124. In fact, the heat transfer coefficient may be determined (step 110) at any point during the first period of time. This is made possible, at least in part, because the first flow probe assembly 122a may collect and process information, including the two different operating temperatures of the respective resistive heaters 142, 152, simultaneously. In some examples, both flow probes 124, 126 may be operated at elevated temperatures above an ambient temperature.

Returning again to the method 200 of FIG. 10, during the first period of time (i.e., while the single flow probe control unit 160 is maintaining the first resistive heater 142 at the first operating temperature and maintaining the second resistive heater 152 at the second operating temperature (or within a predetermined range thereof)), the functionality shown at step 210 may be performed. At step 210, the single flow probe control unit 160 may determine a heat transfer coefficient at the first resistive heater 142. The single flow probe control unit 160 may determine the heat transfer coefficient as previously described above by receiving the voltage and the current applied to the first resistive heater 142 and the voltage and current applied to the second resistive heater 152. The single flow probe control unit 160 may, for example, utilize the measured operating parameters, Eq. 1, Eq. 2 and/or other relationships described herein.

At step 206, the single flow probe control unit 160 may energize the first resistive heater 142 to achieve and maintain the second operating temperature. As noted above, the second operating temperature may comprise a temperature that is at or near an ambient temperature in the exhaust duct 32. In such embodiments, the single flow probe control unit 160 may cause a nominal voltage to be applied to the first resistive heater 142 and permit the first resistive heater 142 to reach the ambient temperature in the exhaust duct 32. In other embodiments, the second operating temperature may comprise another elevated temperature that is different from, yet out of phase with, the first operating temperature. In some embodiments, step 206 may be similar to step 202, except that the single flow probe control unit 160 may utilize the first flow probe control circuit 170 to adjust the voltage applied to the first resistive heater 142 until the first resistive heater 142 achieves the second operating temperature (or a temperature within a predetermined range thereof). The second operating temperature may be various suitable operating temperatures as previously described, except that the second operating temperature is different from, and out of phase with, the first operating temperature.

During the second period of time (i.e., while the single flow probe control unit 160 is maintaining the first resistive heater 142 at the second operating temperature and maintaining the second resistive heater 152 at the first operating temperature (or within a predetermined range thereof)), the functionality shown at step 210 may be performed. At step 210, the single flow probe control unit 160 may determine a heat transfer coefficient at the second resistive heater 142. The single flow probe control unit 160 may determine the heat transfer coefficient as previously described above by receiving the voltage and the current applied to the first resistive heater 142 and the voltage and current applied to the second resistive heater 152. The single flow probe control unit 160 may, for example, utilize the measured operating parameters, Eq. 1, Eq. 2 and/or other relationships described herein.

The method may also include step 212, during which the single flow probe control unit 160 may provide flow information to another control system, to a database, or to a device for communication or display.

Regarding the flow probe apparatus circuit of FIG. 9B in conjunction with FIG. 10, the first flow probe control 161 energizes a first probe 124 in step 202. The second flow probe control 162 energizes a second probe 126 in step 206. The first flow probe control 161 continuously micro-adjusts the voltage delivered to the resistive heater 142 in order to maintain the first operating temperature at or within the predetermined temperature range. The second flow probe control 162 continuously micro-adjusts the voltage delivered to the resistive heater 152 in order to maintain the second operating temperature at or within the predetermined temperature range.

At step 204 the first flow probe control unit 161 or control system 44 may determine whether a first period of time for the first probe 124 has passed. At step 208 the second flow probe control unit 162 or control system 44 may determine whether a first period of time for the second probe 126 has passed. The first period of time for the first probe 124 and the first period of time for the second probe 126 do not need to be the same period of time.

During the first period of time (i.e., while the first flow probe control unit 161 is maintaining the first resistive heater 142 at the first operating temperature and the second flow probe control unit 162 is maintaining the second resistive heater 152 at the second operating temperature (or within a predetermined range thereof)), the functionality shown at step 210 may be performed by the control system 44.

At step 204 the first flow probe control unit 161 may energize the first resistive heater 142 to achieve a second operating temperature. At step 208 the second flow probe control unit 162 may energize the second resistive heater 152 to achieve a first operating temperature. The first flow probe control 161 continuously micro-adjusts the voltage delivered to the resistive heater 142 in order to maintain the second operating temperature at or within the predetermined temperature range. The second flow probe control 162 continuously micro-adjusts the voltage delivered to the resistive heater 152 in order to maintain the first operating temperature at or within the predetermined temperature range.

At step 208 the first flow probe control unit 161 or control system 44 may determine whether a second period of time for the first probe 124 has passed. At step 204 the second flow probe control unit 162 or control system 44 may determine whether a second period of time for the second probe 126 has passed. The second period of time for the first probe 124 and the second period of time for the second probe 126 do not need to be the same period of time.

During the second period of time (i.e., while the first flow probe control unit 161 is maintaining the first resistive heater 142 at the second operating temperature and the second flow probe control unit 162 is maintaining the second resistive heater 152 at the first operating temperature (or within a predetermined range thereof)), the functionality shown at step 210 may be performed by the control system 44.

The method may also include step 212, during which the flow probe control units 161 and 162, or control system 44, may provide flow information to another control system, to a database, or to a device for communication or display.

Illustrative embodiments of an apparatus according to the present invention include a first illustrative embodiment of an apparatus for measuring flow of cryogen exhaust gas from a freezer, which includes: a flow probe comprising a resistive heater; and a flow probe control coupled to the flow probe and comprising a control circuit configured to: operate the resistive heater at a first temperature for a first period of time, operate the resistive heater at a second temperature for a second period of time, and determine a heat transfer coefficient at the flow probe, wherein the first temperature and the second temperature are different and at least one of the first temperature and the second temperature is greater than a predetermined threshold temperature.

According to a second illustrative embodiment of the apparatus for measuring flow of cryogen exhaust gas from a freezer, provided is the apparatus of the first illustrative embodiment, wherein the flow probe control is further configured to indirectly determine a temperature of cryogen exhaust gas present at the flow probe.

According to a third illustrative embodiment of the apparatus for measuring flow of cryogen exhaust gas from a freezer, provided is the apparatus of the second illustrative embodiment, wherein the temperature of the cryogen exhaust gas is determined based on a first measured current through the resistive heater operated at the first temperature, and a second measured current through the resistive heater operated at the second temperature.

According to a fourth illustrative embodiment of the apparatus for measuring flow of cryogen exhaust gas from a freezer, provided is the apparatus of the second illustrative embodiment, wherein the flow probe control is configured to determine the heat transfer coefficient and the temperature of the cryogen exhaust gas from information received from the resistive heater.

According to a fifth illustrative embodiment of the apparatus for measuring flow of cryogen exhaust gas from a freezer, provided is the apparatus of the second illustrative embodiment, wherein the heat transfer coefficient and the temperature of the cryogen exhaust gas are determined without a sensor separate from the resistive heater.

According to a sixth illustrative embodiment of the apparatus for measuring flow of cryogen exhaust gas from a freezer, provided is the apparatus of the first illustrative embodiment, wherein the flow probe control is configured to continuously alternate operating the resistive heater at the first temperature for the first period of time, and operating the resistive heater at the second temperature for the second period of time.

According to a seventh illustrative embodiment of the apparatus for measuring flow of cryogen exhaust gas from a freezer, provided is the apparatus of the first illustrative embodiment, wherein the predetermined threshold temperature is 100° Fahrenheit (38° Celsius).

According to an eighth illustrative embodiment of the apparatus for measuring flow of cryogen exhaust gas from a freezer, provided is the apparatus of the first illustrative embodiment, wherein the flow probe is configured to be mounted in an exhaust duct of the freezer.

According to a ninth illustrative embodiment of the apparatus for measuring flow of cryogen exhaust gas from a freezer, provided is the apparatus of the first illustrative embodiment, further comprising a cryogen control valve, wherein the flow probe control is further configured to cause the cryogen control valve to stop a flow of cryogen when the heat transfer coefficient is determined to be less than a predetermined heat transfer threshold.

According to a tenth illustrative embodiment of the apparatus for measuring flow of cryogen exhaust gas from a freezer, provided is the apparatus of the first illustrative embodiment, wherein the control probe is further configured to operate the resistive heater at a third temperature for a third period of time, the third temperature being different from the first temperature and the second temperature.

According to an eleventh illustrative embodiment of the apparatus for measuring flow of cryogen exhaust gas from a freezer, provided is the apparatus of the first illustrative embodiment, further comprising: a second flow probe comprising a second resistive heater, wherein the flow probe control is also coupled to the second flow probe and the control circuit is further configured to: operate the second resistive heater at the second temperature during the first period of time, and operate the second resistive heater at the first temperature during the second period of time, such that an operating temperature of the second flow probe remains out of phase with an operating temperature of the flow probe.

Illustrative embodiments of a method according to the present invention include a first illustrative embodiment of a method of determining a flow velocity of a cryogen exhaust gas from a freezer comprising: energizing a flow probe with a first voltage to maintain a first temperature for a first period of time; energizing the flow probe with a second voltage to maintain a second temperature for a second period of time, wherein the second temperature is different from the first temperature; determining a heat transfer coefficient at the flow probe; and determining a velocity of the cryogen exhaust gas at the flow probe based on the heat transfer coefficient.

According to a second illustrative embodiment of the method for determining a flow velocity of a cryogen exhaust gas from a freezer, provided is the method of the first illustrative embodiment, further comprising determining a temperature of the cryogen exhaust gas at the flow probe.

According to a third illustrative embodiment of the method for determining a flow velocity of a cryogen exhaust gas from a freezer, provided is the method of the second illustrative embodiment, wherein the flow probe comprises a resistive heater, and further comprising determining the temperature of the cryogen exhaust gas at the flow probe using the resistive heater.

According to a fourth illustrative embodiment of the method for determining a flow velocity of a cryogen exhaust gas from a freezer, provided is the method of the second illustrative embodiment, further comprising: measuring a first current through the flow probe during the first period of time; measuring a second current through the flow probe during the second period of time; and determining the temperature of the cryogen exhaust gas at the flow probe based on the first current and the second current.

According to a fifth illustrative embodiment of the method for determining a flow velocity of a cryogen exhaust gas from a freezer, provided is the method of the first illustrative embodiment, wherein the flow probe comprises a resistive heater, and further comprising: determining the heat transfer coefficient and the temperature of the cryogen exhaust gas without a sensor separate from the resistive heater in the flow probe.

According to a sixth illustrative embodiment of the method for determining a flow velocity of a cryogen exhaust gas from a freezer, provided is the method of the first illustrative embodiment, further comprising repeating the energizing the flow probe at the first temperature and the energizing the flow probe at the second temperature during operating of the freezer.

According to a seventh illustrative embodiment of the method for determining a flow velocity of a cryogen exhaust gas from a freezer, provided is the method of the first illustrative embodiment, wherein the first temperature and the second temperature are both greater than a predetermined temperature threshold.

According to an eighth illustrative embodiment of the method for determining a flow velocity of a cryogen exhaust gas from a freezer, provided is the method of the seventh illustrative embodiment, wherein the predetermined temperature threshold is 100° Fahrenheit (38° Celsius).

According to a ninth illustrative embodiment of the method for determining a flow velocity of a cryogen exhaust gas from a freezer, provided is the method of the first illustrative embodiment, further comprising mounting the flow probe in an exhaust duct of the freezer.

According to a tenth illustrative embodiment of the method for determining a flow velocity of a cryogen exhaust gas from a freezer, provided is the method of the first illustrative embodiment, further comprising sending a signal to a cryogen control valve to cause cryogen to stop flowing in the freezer.

According to an eleventh illustrative embodiment of the method for determining a flow velocity of a cryogen exhaust gas from a freezer, provided is the method of the first illustrative embodiment, wherein the cryogen is selected from the group consisting of nitrogen and carbon dioxide.

According to a twelfth illustrative embodiment of the method for determining a flow velocity of a cryogen exhaust gas from a freezer, provided is the method of the first illustrative embodiment, further comprising: energizing a second flow probe with the second voltage to maintain the second temperature for the first period of time, and energizing the second flow probe with the first voltage to maintain the first temperature for the second period of time, such that an operating temperature of the second flow probe remains out of phase with an operating temperature of the flow probe.

It will be understood that the embodiments described herein are merely exemplary, and that a person skilled in the art may make variations and modifications without departing from the spirit and scope of the invention. All such variations and modifications are intended to be included within the scope of the invention as provided in the appended claims. It should be understood that the embodiments described above are not only in the alternative but can be combined.

What is claimed is:

1. An apparatus, comprising:
a flow probe comprising a resistive heater; and
a flow probe control coupled to the flow probe and comprising a control circuit configured to:
operate the resistive heater at a first temperature for a first period of time,
operate the resistive heater at a second temperature for a second period of time, and
determine a heat transfer coefficient at the flow probe, wherein the first temperature and the second temperature are different and at least one of the first temperature and the second temperature is greater than a predetermined threshold temperature.

2. The apparatus of claim 1, wherein the flow probe control is further configured to indirectly determine a temperature of cryogen exhaust gas present at the flow probe.

3. The apparatus of claim 2, wherein the temperature of the cryogen exhaust gas is determined based on a first measured current through the resistive heater operated at the first temperature, and a second measured current through the resistive heater operated at the second temperature.

4. The apparatus of claim 2, wherein the flow probe control is configured to determine the heat transfer coefficient and the temperature of the cryogen exhaust gas from information received from the resistive heater.

5. The apparatus of claim 2, wherein the heat transfer coefficient and the temperature of the cryogen exhaust gas are determined without a sensor separate from the resistive heater.

6. The apparatus of claim 1, wherein the flow probe control is configured to continuously alternate operating the resistive heater at the first temperature for the first period of time, and operating the resistive heater at the second temperature for the second period of time.

7. The apparatus of claim 1, wherein the predetermined threshold temperature is 100° Fahrenheit (38° Celsius).

8. The apparatus of claim 1, wherein the flow probe is configured to be mounted in an exhaust duct of the freezer.

9. The apparatus of claim 1, further comprising a cryogen control valve, wherein the flow probe control is further configured to cause the cryogen control valve to stop a flow of cryogen when the heat transfer coefficient is determined to be less than a predetermined heat transfer threshold.

10. The apparatus of claim 1, wherein the control probe is further configured to operate the resistive heater at a third temperature for a third period of time, the third temperature being different from the first temperature and the second temperature.

11. The apparatus of claim 1, further comprising:

a second flow probe comprising a second resistive heater, wherein the flow probe control is also coupled to the second flow probe and the control circuit is further configured to:

operate the second resistive heater at the second temperature during the first period of time, and operate the second resistive heater at the first temperature during the second period of time, such that an operating temperature of the second flow probe remains out of phase with an operating temperature of the flow probe.

* * * * *